(12) United States Patent
Kleinerman et al.

(10) Patent No.: US 6,470,047 B1
(45) Date of Patent: Oct. 22, 2002

(54) APPARATUS FOR AND METHOD OF REDUCING INTERFERENCE IN A COMMUNICATIONS RECEIVER

(75) Inventors: Alexander Kleinerman, Natania; Ariel Zaltsman, Ra'anana; Edo Navon, Ramat Hasharon; Yuval Bachar, Herzelia, all of (IL)

(73) Assignee: Comsys Communications Signal Processing Ltd. (IL)

( * ) Notice: Subject to any disclaimer, the term of this patent is extended or adjusted under 35 U.S.C. 154(b) by 23 days.

(21) Appl. No.: 09/789,439

(22) Filed: Feb. 20, 2001

(51) Int. Cl.[7] .............................. H03H 7/40; H04B 1/10
(52) U.S. Cl. ..................................... 375/232; 375/350
(58) Field of Search .............................. 375/232, 233, 375/234, 235, 236, 340, 341, 343, 346, 349, 350; 333/18, 28 R

(56) References Cited

U.S. PATENT DOCUMENTS

| | | | | |
|---|---|---|---|---|
| 5,537,443 A | * | 7/1996 | Yoshino et al. ............. | 375/340 |
| 5,543,978 A | * | 8/1996 | Park ............................ | 360/46 |
| 5,654,765 A | * | 8/1997 | Kim ............................ | 348/614 |
| 5,761,088 A | * | 6/1998 | Hulyalkar et al. .......... | 348/611 |
| 6,236,263 B1 | * | 5/2001 | Iwamatsu .................... | 329/304 |

OTHER PUBLICATIONS

U.S. patent application No. 09/616,161, Yakhnich et al., filed Jul. 14, 2000.

* cited by examiner

Primary Examiner—Don N. Vo
(74) Attorney, Agent, or Firm—Howard Zaretsky

(57) ABSTRACT

A novel and useful apparatus for and method of interference reduction in a communications receiver. The invention first finds the channel estimate and the noise vector from the receive signal. An interference detector is then used to choose an appropriate compensation filter and select between adaptive and deterministic moving average models for noise prediction. After compensation filtering, a new channel estimate and noise vector is calculated. The new noise vector is used to determine noise whitening coefficients if the adaptive model is used. In the deterministic model case, the coefficients do not need to be calculated since they are already known, having been calculated a priori. The noise whitening coefficients are then used in an equalizer such as a Viterbi algorithm based equalizer.

62 Claims, 10 Drawing Sheets

APPARATUS FOR AND METHOD OF REDUCING INTERFERENCE IN A COMMUNICATIONS RECEIVER

REFERENCE TO RELATED APPLICATIONS

The subject matter of the present application is related to and may be advantageously combined with the subject matter of copending and commonly owned application U.S. patent application Ser. No. 09/616,161, to Yakhnich et al, filed Jul. 14, 2000, entitled "Method of Channel Order Selection and Channel Order Estimation in a Wireless Communication System," incorporated herein by reference in its entirety.

FIELD OF THE INVENTION

The present invention relates generally to communication systems and more particularly relates to an apparatus for and a method of reducing interference in a communications receiver.

BACKGROUND OF THE INVENTION

In recent years, the world has witnessed explosive growth in the demand for wireless communications and it is predicted that this demand will increase in the future. There are already over 500 million users that subscribe to cellular telephone services and the number is continually increasing. Eventually, in the not too distant future the number of cellular subscribers will exceed the number of fixed line telephone installations. Already, in many cases, the revenues from mobile services already exceeds that for fixed line services even though the amount of traffic generated through mobile phones is much less than in fixed networks.

Other related wireless technologies have experienced growth similar to that of cellular. For example, cordless telephony, two-way radio trunking systems, paging (one way and two way), messaging, wireless local area networks (WLANs) and wireless local loops (WLLs). In addition, new broadband communication schemes are rapidly being deployed to provide users with increased bandwidth and faster access to the Internet. Broadband services such as xDSL, short range high speed wireless connections, high rate satellite downlink (and the uplink in some cases) are being offered to users in more and more locations.

Along with the unprecedented expansion in the field of communications (e.g., radio, mobile, fiber and satellite communications, etc.), comes an increased interest in the problems associated with noise and interference. Radio interference is described as the presence of unwanted RF signals that impair radio reception and can be either accidental or intentional. In addition, interference can be caused by external means (e.g., neighboring communications systems, co-channel and adjacent interference, etc.) or by internal processes utilized in the process of communication (e.g., intersymbol interference, etc. Examples of radio interference include co-channel interference, adjacent channel interference, intersymbol interference, electromagnetic interference (EMI), splatter, harmonics, spurious emissions, spurious response, jamming and band congestion.

In mobile communications, however, four types of interference dominate. These include co-channel interference, adjacent channel interference, intersymbol interference and interference due to system nonlinearities. In co-channel interference, the interfering signal has the same carrier frequency as the desired information signal. The interfering signal usually is at a lower power level than the desired signal making reception difficult but possible. Higher power levels cause the desired signal to be jammed and reception impossible.

Adjacent channel interference occurs when a radio receiver is tuned to a particular frequency and interference is received from a signal on a nearby frequency. This type of interference is likely when an extremely strong interfering signal lies near the desired information signal. In other words, the interfering signal has a carrier frequency adjacent to the frequency of the desired information signal. Using a selective filter having a suitable bandwidth for the signal to be received while making the adjacent channel response as low as possible is one possible approach to reducing the effects of this type of interference.

In intersystem interference, the interfering signal comes from a different system, which operates either within the geographic proximity of the system or comes from another system, typically non-friendly, that generates an interfering signal of sufficient strength to totally disrupt communications. The latter type of interference is known as jamming and is usually used during wartime to disrupt enemy communications, radar, radiolocations and radio navigation. This type of interference is not very common in cellular systems.

Interference can also be caused by nonlinearities in the system and/or other effects of filters such as intermodulation distortion wherein nonlinear system components (especially in analog signal transmission) cause spurious signals, which may play a role in causing interference in adjacent channels. Intersymbol interference (ISI) in digital transmission operates to effectively lower the bit error rate (BER). ISI can be caused by the filtering of neighboring symbols using filters that do not meet the Nyquist conditions or by channel scattering, such as occurs in mobile communication.

In addition, internal circuit noise such as thermal noise, shot noise, hiss, for example, is produced by the active components making up the electronic equipment. At high frequencies, i.e. above 30 MHz, it is important that internal noise be kept as low as possible in the first stages of a multistage amplifier chain because any noise generated in one amplifier will be picked up and amplified along with the desired signals in subsequent stages. This type of noise is always present in communication systems and samples of this type of noise are typically uncorrelated, i.e., they constitute white noise.

Not all the above types of interference require special attention in the receiver of mobile communication systems. In the GSM standard, for example, the types of interference most frequently encountered include co-channel interference, adjacent channel interference and interference due to nonlinearities in the system.

In mobile radio systems, some form of equalization is required to deal with the effects of channel scattering and also with the effects of ISI caused by transmit and receive filters. An example of a commonly used type of equalizer includes the maximum likelihood sequence estimation (MLSE) equalizer that utilizes the well known Viterbi Algorithm (VA). The goal is to limit the ISI as much as possible while maintaining a reasonable complexity for the receiver.

Another important consideration in the design of the system is the degree of whiteness and Gaussian distribution of the noise sources other then ISI. For example, in the case wherein the main noise source is thermal additive white Gaussian noise (AWGN) noise, simple equalization can be used to reduce the noise. Other types of noise and interference, such as co-channel and adjacent channel interference, however, require additional treatment. The goal is to find a receive filter that maximizes the signal to interference ratio (SIR) in this case while keeping ISI at as low a level as possible. In addition, interference suppression (i.e. cancellation) should be applied in an attempt to remove the interference from the received signal before a decision about the data is made.

A diagram illustrating an example prior art communication system employing an inner and outer encoder in the transmitter, inner and outer decoding stages in the receiver and a noise source after the channel is shown in FIG. 1. The communication system, generally referenced 10, represents the typical scheme that is used in mobile radio transceivers. In such a system, the transmitter 11 comprises an encoder 14, symbol generator (i.e. bit to symbol mapper) 16 and modulator 18. Input data bits 12 to be transmitted are input to the encoder 14 which may comprise an error correction encoder such as Reed Solomon, convolutional encoder, parity bit generator, etc. The encoder functions to add redundancy bits to enable errors in transmission to be located and fixed.

It is noted that both the inner and outer decoders in the receiver have complimentary encoders in the transmitter. The outer encoder in the transmitter comprises the encoder 14, e.g., Reed Solomon, etc. The inner encoder comprises the channel 20 that often times can be modeled as an L-symbol long FIR-type channel.

The bits output from the encoder may optionally be interleaved wherein the order of the bits are changed so as to more efficiently combat burst errors. The rearrangement of the bits caused by interleaving improves the resistance to burst errors while adding latency and delay to the transmission.

The bits are then mapped to symbols by the bit to symbol mapper 16. The bit to symbol mapper functions to transform the bits to modulator symbols. For example, an 8-PSK modulator as used in GSM EDGE systems uses 8 symbols $S_k$ (k=0 . . . 7), hence the mapper takes three bits and converts them to one of eight symbols. Thus, the bit to symbol mapper generates a symbol for every three input bits.

The output from the mapper is input to the modulator 18 which receives symbols in the M-ary alphabet and generates the analog signal that is subsequently transmitted over the channel 20. The channel may comprise a mobile wireless channel, e.g., cellular, cordless, a fixed wireless channel, e.g., satellite, or may comprise a wired channel, e.g., xDSL, ISDN, Ethernet, etc. The processing performed in the transmitter is intended to generate a signal that can be transmitted over the channel so as to provide robust, error free detection by the receiver.

At the receiver 13, the analog signal from the channel is input to front end circuitry 22 which demodulates and samples the received signal to generate received samples y(k) 21. The symbols are then input to an inner decoder 24. An example of an inner decoder is an equalizer which compensates for the ISI caused by the delay and time spreading of the channel in attempting to detect the symbols that were originally transmitted by the modulator.

Equalizers can be adapted to output hard symbol decisions or soft symbol decisions. Examples of types of commonly used hard decision equalizers include the maximum likelihood sequence estimation (MLSE) equalizer that utilize the well known Viterbi Algorithm (VA), linear equalizer and decision feedback equalizer (DFE). Examples of soft output type equalizers include Soft Output Viterbi Algorithm (SOVA) type equalizers and equalizers based on the more computationally expensive Maximum A Posteriori (MAP) algorithm.

In the case of a hard output equalizer, the output of the inner decoder comprises symbols s(k) 23 which represent hard decisions. If a soft output decoder is used, the symbols s(k) output of the inner decoder comprise soft symbol decisions. The output of the inner decoder is then input to a soft output generator (not shown) which functions to generate soft decision information.

If interleaving was employed in the transmitter, a de-interleaver (not shown) is used to restore the original order of either the symbols or the bits, depending on the type of de-interleaver used. The bits are then input to an outer decoder 26 which functions to locate and fix errors using the redundancy inserted by the encoder. The outer decoder generates the binary receive data $a_k$ 28.

Examples of the outer decoder include turbo decoders and convolutional decoders that utilize the Viterbi Algorithm. This class of decoders provides better performance by taking into account soft information about the reliability of the received symbol. The improved performance of the decoder cannot be realized, however, when soft information about the received symbols is not available. Note that the Viterbi algorithm is widely used in communication systems and has been adapted to perform functions including demodulation, decoding, equalization, etc. Many systems utilize the Viterbi Algorithm in both the inner and outer decoding stages.

As described above, the outer decoder, in some systems, is adapted to utilize the symbol decisions output from the inner decoder, e.g., the equalizer. Optimal decoders, however, require soft decisions rather than hard decisions. For example, an outer decoder that utilizes the Viterbi Algorithm to perform convolutional forward error correction decoding, requires soft decisions as input. The advantage of a Viterbi decoder is that it can efficiently process soft decision information. In order to provide soft symbol decisions, the inner decoder typically comprises a soft output equalizer such as a SOVA or MAP based equalizer.

A drawback of the above described mobile radio system is that it lacks a mechanism for efficiently combating the types of interference most likely to effect mobile radio systems, such as co-channel interference, adjacent channel interference and interference caused by nonlinearities such as from transmit and receiver filtering.

It is desirable, therefore, to have a mobile radio receiver that is capable of reducing the types of interference that are likely to cause the most performance degradation in the receiver while achieving at the same time a minimum ISI. Ideally, the filter dynamically adjusts its characteristics in accordance with the type of interference detected in the received signal. Thus, the receiver should maximize the signal to interference ratio while keeping ISI at a minimum.

SUMMARY OF THE INVENTION

Accordingly, the present invention provides a novel and useful apparatus for and method of interference reduction in a communications receiver. The present invention is suitable for use with a wide range of channels and types of interference and is particularly useful in reducing the interference encountered in GSM, EDGE and other types of cellular channels. These types of channels are typically characterized by rapidly changing impulse response and the invention is operative to model the interference frequently encountered in such channels, generate an estimate of the noise based on the model and to subtract the estimated noise from the receive signal.

To aid in illustrating the principles of the present invention, the apparatus and method are presented in the context of a GSM mobile station. It is not intended that the scope of the invention be limited to the examples presented herein. One skilled in the art can apply the principles of the present invention to numerous other types of communication systems as well.

Ideally, an optimal receive filter can be found and used in the receiver for each given interference, thus resulting in significantly better performance. Since the receive filter cannot be chosen before the type of the interference present is known, a compensation or post filter is used as the next best alternative. An optimal receive filter can only be found after sampling the receive signal which is performed after the receive filter in the Rx front end. For example, if it is found that most of the noise energy is on side of the spectrum then it would be desirable to use a narrow receive filter at the input.

Thus, in accordance with a key aspect of the present invention a receive filter is found that maximizes the signal to interference ratio in the presence of various types of interference while keeping ISI as small as possible.

In accordance with the invention, the receive filter is fixed and is used for all types of interference, since it is not possible to determine the type of the interference before the receive filter. After the receive filter, however, the signal can be sampled and the samples used to find the necessary parameters to detect the type of interference present. The output of the interference detector comprises a determination of the type of interference. Thus, for each specific interference a compensation filter is used whose impulse response convoluted with the impulse response of the receive filter yields an impulse response as close to the desired response as possible.

The invention is operative to first find the channel estimate and the noise vector from the receive signal. Then, an interference detector is used to choose an appropriate compensation filter and select between adaptive and deterministic moving average models for noise prediction. After compensation filtering, a new channel estimate and noise vector is calculated. The new noise vector is used to determine noise whitening coefficients if the adaptive model is used. In the deterministic model case, the coefficients do not need to be calculated since they are already known, having been calculated a priori. The noise whitening coefficients are then used in an equalizer such as a Viterbi algorithm based equalizer. Note that the present invention is effective to improve the performance of the receiver in presence of residual interference having a well defined spectrum.

The invention comprises an interference detector that is operative to output a template chosen from among a plurality of interference templates. In addition, the detector outputs the type of template which may be either deterministic or adaptive and a metric that is indicative of the reliability of the decision. The particular interference template and its associated reliability are used to determine the coefficients for the compensation filter that is used to filter the received signal.

In accordance with the invention, the interference detector is effective to improve the calculation of the noise whitening model coefficients resulting in better noise whitening inside the non-linear sequence decision equalizer thus achieving better overall performance of the receiver.

Many aspects of the previously described invention may be constructed as software objects that execute in embedded devices as firmware, software objects that execute as part of a software application on a computer system running an operating system such as Windows, UNIX, LINUX, etc., an Application Specific Integrated Circuit (ASIC), Field Programmable Gate Array (FPGA) or functionally equivalent discrete hardware components.

There is therefore provided in accordance with the present invention a method of reducing interference in a communications receiver coupled to a channel, the method comprising the steps of determining a plurality of interference templates, each interference template comprising statistics derived from a different interference signal, generating statistics of a noise vector derived from a received signal, selecting an interference template corresponding to a best match between the noise vector statistics and each the interference template, generating noise whitening coefficients in accordance with the selected interference template and filtering the received signal utilizing a compensation filter whose filter coefficients are chosen in accordance with the selected interference template.

There is also provided in accordance with the present invention an apparatus for reducing interference in a communications receiver coupled to a channel, the method comprising the steps of template generation means for determining a plurality of interference templates, each interference template comprising statistics derived from a different interference signal, a noise vector determination mechanism operative to generate statistics of a noise vector derived from a received signal, an interference detector operative to select an interference template corresponding to a best match between the noise vector statistics and each the interference template, means for generating noise whitening coefficients in accordance with the selected interference template and a compensation filter adapted to filter the received signal, the compensation filter comprising filter coefficients choosen in accordance with the selected interference template .

There is further provided in accordance with the present invention a method of reducing interference in a communications receiver coupled to a channel, the method comprising the steps of determining a plurality of interference templates, each interference template comprising statistics derived from a different interference signal and being of either a deterministic type or an adaptive type, generating statistics of a noise vector derived from a received signal, selecting an interference template corresponding to a best match between the noise vector statistics and each the interference template, if the selected interference template is of the deterministic type, generating noise whitening coefficients utilizing previously calculated coefficients, if the selected interference template is of the adaptive type, generating noise whitening coefficients utilizing a moving average model and equalizing the received signal utilizing equalization coefficients derived from the noise whitening coefficients.

There is also provided in accordance with the present invention an apparatus for reducing interference in a communications receiver coupled to a channel, the method comprising the steps of template generation means for determining a plurality of interference templates, each interference template comprising statistics derived from a different interference signal and being of either a deterministic type or an adaptive type, a noise vector determination mechanism operative to generate statistics of a noise vector derived from a received signal, an interference detector operative to select an interference template corresponding to a best match between the noise vector statistics and each the interference template, means for generating noise whitening coefficients utilizing previously calculated coefficients if the selected interference template is of the deterministic type or utilizing a moving average model if the selected interference template is of the adaptive type and an equalizer operative to equalize the received signal utilizing equalization coefficients derived from the noise whitening coefficients.

There is still further provided in accordance with the present invention a method of reducing interference in a communications receiver coupled to a channel, the method comprising the steps of determining a plurality of interference templates, each interference template comprising statistics derived from a different interference signal and being of either a deterministic type or an adaptive type, generating statistics of a noise vector derived from a received signal, selecting an interference template corresponding to a best match between the noise vector statistics and each the interference template, generating a first plurality of noise whitening coefficients in accordance with the selected interference template, if the selected interference template is of the deterministic type, generating a second plurality of noise whitening coefficients utilizing previously calculated coefficients, if the selected interference template is of the adaptive type, generating the second plurality of noise whitening coefficients utilizing a moving average model, filtering the received signal utilizing a compensation filter whose filter coefficients are chosen in accordance with the selected interference template and equalizing the output of compensation filter utilizing equalization coefficients derived from the first plurality of noise whitening coefficients.

There is also provided in accordance with the present invention a communications receiver for receiving and decoding an M-ary transmitted signal comprising a radio frequency (RF) front end circuit for receiving and converting the M-ary transmitted signal to a baseband signal, a demodulator adapted to receive the baseband signal and to generate a received signal therefrom in accordance with the M-ary modulation scheme used to generate the transmitted signal, an interference reduction mechanism operative to determine a plurality of interference templates, each interference template comprising statistics derived from a different interference signal and being of either a deterministic type or an adaptive type, generate statistics of a noise vector derived from a received signal, select an interference template corresponding to a best match between the noise vector statistics and each the interference template, generate a first plurality of noise whitening coefficients in accordance with the selected interference template, if the selected interference template is of the deterministic type, generate a second plurality of noise whitening coefficients utilizing previously calculated coefficients, if the selected interference template is of the adaptive type, generate the second plurality of noise whitening coefficients utilizing a moving average model, a compensation filter adapted to filter the received signal and whose filter coefficients are chosen in accordance with the selected interference template, an equalizer adapted to equalize the output of the compensation filter utilizing equalization coefficients derived from the first plurality of noise whitening coefficients so as to generate a sequence of hard symbol decisions therefrom, a soft output generator adapted to generate soft output decisions from the sequence of hard symbol decisions and a second decoder adapted to receive the soft output values and to generate binary received data therefrom.

There is also provided in accordance with the present invention a computer readable storage medium having a computer program embodied thereon for causing a suitably programmed system to reduce interference noise from within a receive signal by performing the following steps when such program is executed on the system determining a plurality of interference templates, each interference template comprising statistics derived from a different interference signal and being of either a deterministic type or an adaptive type, generating statistics of a noise vector derived from a received signal, selecting an interference template corresponding to a best match between the noise vector statistics and each the interference template, generating a first plurality of noise whitening coefficients in accordance with the selected interference template, if the selected interference template is of the deterministic type, generating a second plurality of noise whitening coefficients utilizing previously calculated coefficients, if the selected interference template is of the adaptive type, generating the second plurality of noise whitening coefficients utilizing a moving average model, filtering the received signal utilizing a compensation filter whose filter coefficients are chosen in accordance with the selected interference template and equalizing the output of compensation filter utilizing equalization coefficients derived from the first plurality of noise whitening coefficients.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| AWGN | Additive White Gaussian Noise |
| BER | Bit Error Rate |
| CDMA | Code Division Multiple Access |
| CRC | Cyclic Redundancy Check |
| DFE | Decision Feedback Equalizer |
| DSL | Digital Subscriber Line |
| DSP | Digital Signal Processor |
| EDGE | Enhanced Data rates for GSM and TDMA/135 Evolution |
| EEROM | Electrically Erasable Read Only Memory |
| EGPRS | Enhanced General Packet Radio System |
| EMI | Electromagnetic Interference |
| FIR | Finite Impulse Response |
| FPGA | Field Programmable Gate Array |
| GERAN | GSM EDGE Radio Access Network |
| GSM | Global System for Mobile Communication |
| ISDN | Integrated Services Digital Network |
| ISI | Intersymbol Interference |
| LS | Least Squares |
| LUT | Look Up Table |
| MA | Moving Average |
| MAP | Maximum A Posteriori |
| MLSE | Maximum Likelihood Sequence Estimation |
| NVRAM | Non-Volatile Random Access Memory |
| PSK | Phase Shift Keying |
| RAM | Random Access Memory |
| ROM | Read Only Memory |
| SIR | Signal to Interference Ratio |
| SNR | Signal to Noise Ratio |
| SOVA | Soft Output Viterbi Algorithm |
| TDMA | Time Division Multiple Access |
| VA | Viterbi Algorithm |
| WLAN | Wireless Local Area Network |
| WLL | Wireless Local Loop |

DETAILED DESCRIPTION OF THE INVENTION

The present invention is an apparatus for and a method of reducing interference in a communications receiver. The method of the present invention is particularly useful in communication systems that are subject to various types of interference such as co-channel interference, adjacent channel interference and interference due to system nonlinearities. These types of interference are typically encountered by mobile radio systems. Examples of mobile radio systems include cellular communications systems, including global systems for mobile communications (GSM), CDMA, TDMA, etc. Other wireless communications systems that can benefit from the present invention include paging communication devices, cordless telephones, telemetry systems, etc.

For illustration purposes, the invention is described in the context of a GSM EDGE mobile radio station. Note, however, that it is not intended that the invention be limited to the example presented herein. It is appreciated that one skilled in the art can apply the principles of the invention to other communications systems (wireless or not).

Figure 1:
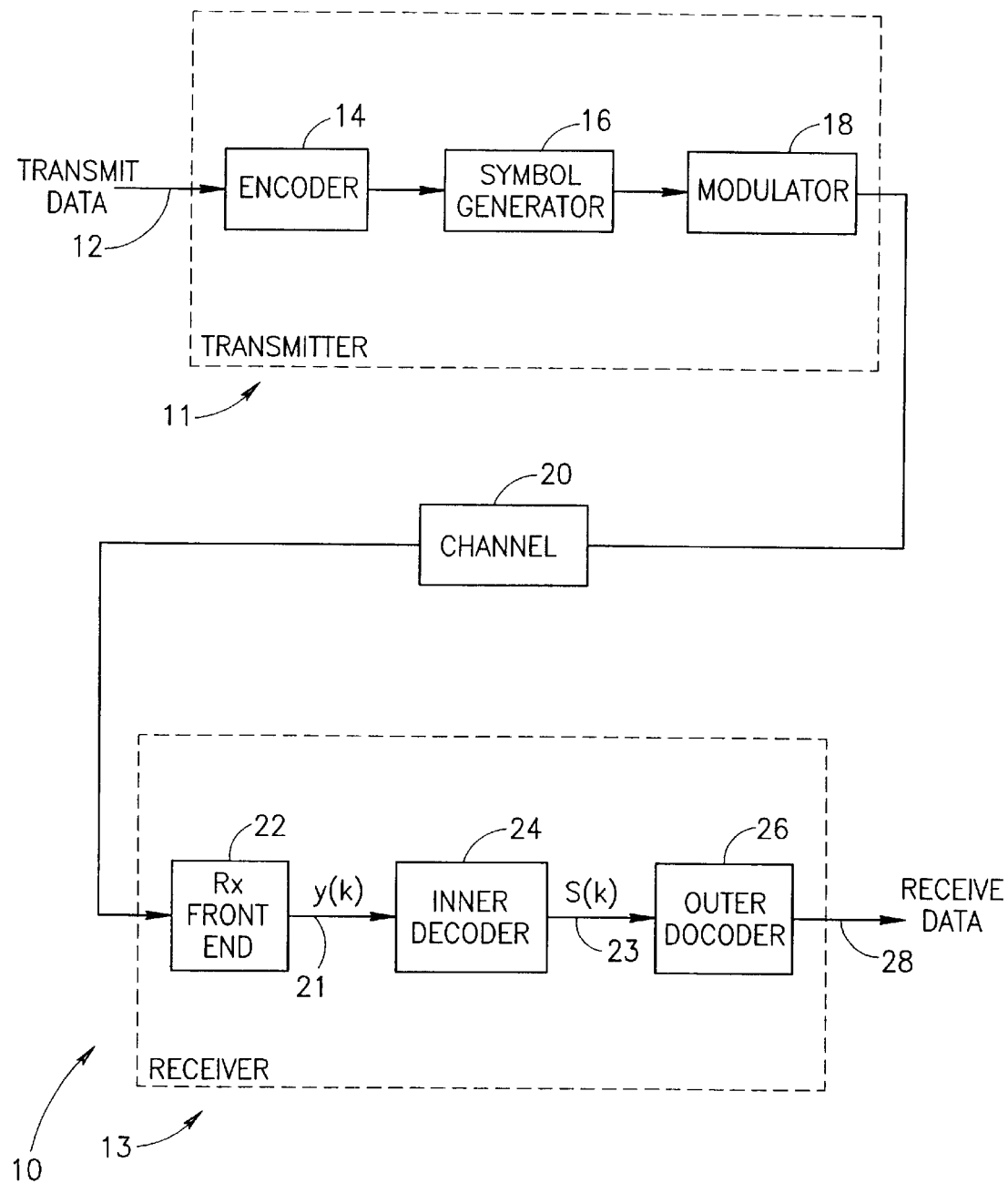
FIG. 1 is a block diagram illustrating an example prior art communication system employing an inner and outer encoder in the transmitter, inner and outer decoding stages in the receiver and a noise source after the channel.
Figure 2:
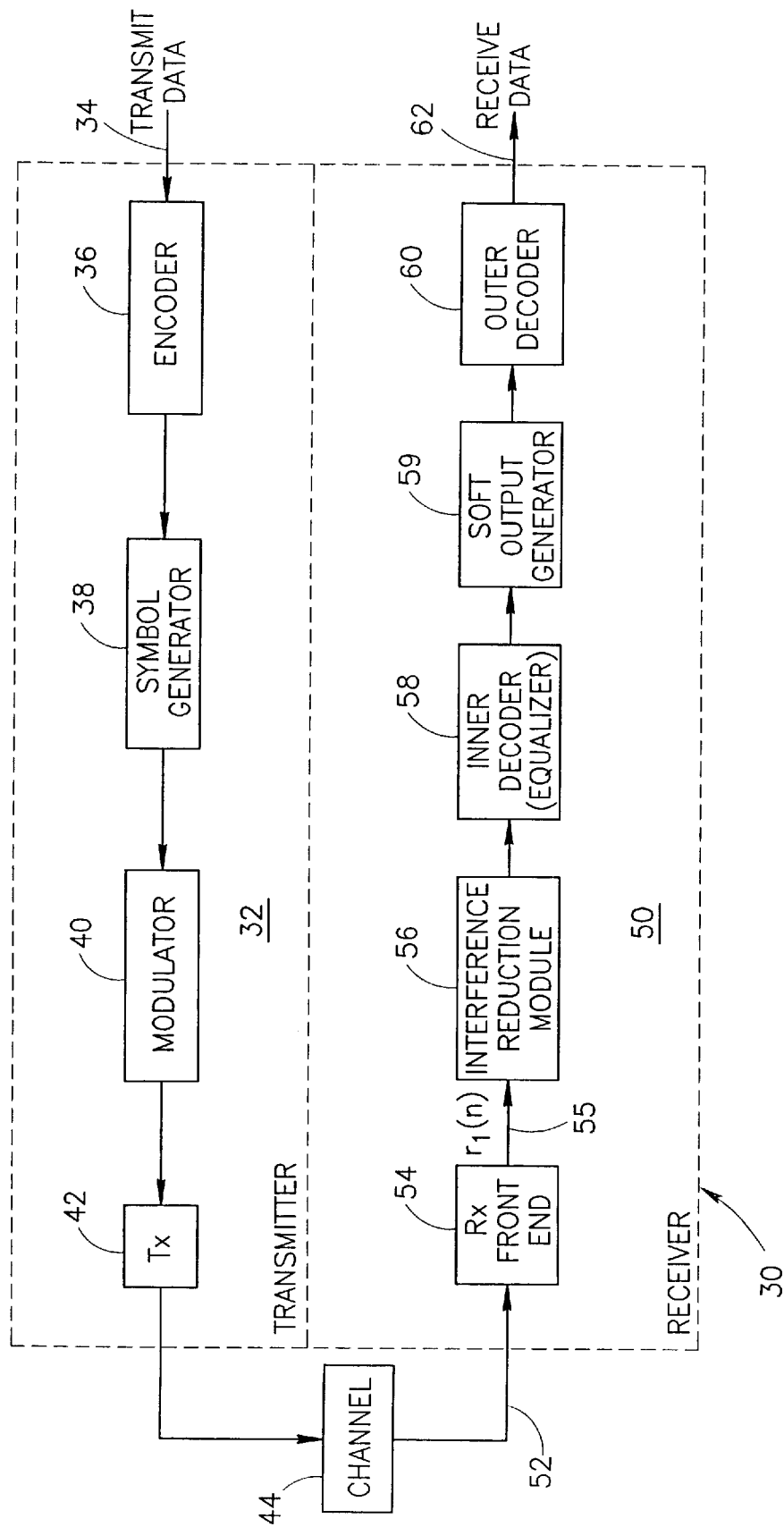
FIG. 2 is a block diagram illustrating a transceiver incorporating an interference reduction module constructed in accordance with the present invention.

A block diagram illustrating a transceiver incorporating an interference reduction module constructed in accordance with the present invention is shown in FIG. 2. The communication system, generally referenced 30, comprises a concatenated encoder transmitter 32 coupled to a channel 44, and a concatenated decoder receiver 50. The transmitter 32 comprises an encoder 36, optional interleaver (not shown), bit to symbol mapper 38, modulator 40 and transmit circuit 42.

Input data bits 34 to be transmitted are input to the encoder 36 which may comprise an error correction encoder such as Reed Solomon, convolutional encoder, parity bit generator, etc. The encoder functions to add redundancy bits to enable errors in transmission to be located and fixed.

The bits output of the encoder 36 are then input to an optional interleaver which functions to rearrange the order of the bits in order to more effectively combat burst errors in the channel. The bits output of the interleaver are then mapped to symbols by the symbol mapper 38. The bit to symbol mapper functions to transform bits to modulator symbols from an M-ary alphabet. For example, an 8-PSK modulator converts input bits into one of eight symbols. Thus, the mapper in this case generates a symbol for every three input bits.

The symbols output from the mapper are input to the modulator 40 which functions to receive symbols in the M-ary alphabet and to generate an analog signal therefrom. The transmit circuit 42 amplifies and filters this signal before transmitting it over the channel 44. The transmit circuit 42 comprises coupling circuitry required to optimally interface the signal to the channel medium.

The channel may comprise a mobile wireless channel, e.g., cellular, cordless, fixed wireless channel, e.g., satellite, or may comprise a wired channel, e.g., xDSL, ISDN, Ethernet, etc. It is assumed that noise is present and added to the signal in the channel. The transmitter is adapted to generate a signal that can be transmitted over the channel so as to provide robust, error free detection by the receiver.

It is noted that both the inner and outer decoders in the receiver have complimentary encoders in the transmitter. The outer encoder in the transmitter comprises the encoder 36, e.g., convolutional, etc. The inner encoder comprises the channel 44 itself, which in one embodiment can be modeled as an L-symbol long FIR-type channel.

At the receiver 50, the analog signal 52 from the channel is input to Rx front end circuitry 54 which demodulates and samples the received signal to generate received samples $r_1(n)$ 55. The symbols are then input to an interference reduction module 56 which analyses the received signal and attempts to determine the type of interference present. In response, the module dynamically filters the received signal and provides suitable coefficients for an equalizer with whitening capability.

The inner decoder comprises an equalizer which compensates for the ISI caused by the delay and time spreading of the channel. The function of the equalizer is to attempt to detect the symbols that were originally transmitted by the modulator and to whiten the received signal. The performance of the outer decoder is optimal when it receives a signal wherein the noise comprises white noise as opposed to correlated noise.

Note that a conventional equalizer with whitening adapted to output either soft or hard symbol decisions may be used. For example, the well known maximum likelihood sequence estimation (MLSE) based equalizer utilizes the well known Viterbi Algorithm (VA), linear equalizer or decision feedback equalizer (DFE). Since this type of equalizer generates hard decisions only, soft decisions must subsequently be generated from the hard decisions. A soft symbol generator suitable for use with the present invention is described in detail in U.S. patent application Ser. No. 09/754,566, filed on Jan. 4, 2001, entitled "Soft Decision Output Generator," similarly assigned and incorporated herein by reference in its entirety.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM systems.

The MLSE technique is a nonlinear equalization technique which is applicable when the radio channel can be modeled as a Finite Impulse Response (FIR) system. Such a FIR system requires knowledge of the channel impulse response tap values. The channel estimate is obtained using a known training symbol sequence to estimate the channel impulse response. Other equalization techniques such as DFE or linear equalization require precise knowledge of the channel.

The soft decisions are subsequently input to a de-interleaver (not shown) if interleaving was employed at the transmitter. The de-interleaver is operative to reconstruct the original order of the bits input to the transmitter 32. The de-interleaved soft bit values are subsequently input to the outer decoder 60 which functions to locate and fix errors using the redundancy inserted by the encoder in the transmitter. The outer decoder generates the binary receive data 62.

The outer decoder is a soft decoder, i.e. it takes soft bit values as input, which functions to detect and correct errors using the redundancy bits inserted by the encoder. The outer decoder generates the binary receive data utilizing the soft bit input. Examples of the outer decoder include convolutional decoders utilizing the Viterbi Algorithm, etc. Soft decision Viterbi decoders have the advantage of efficiently processing soft decision information and providing optimum performance in the sense of minimum sequence error probability.

Interference Reduction Module

Figure 3:
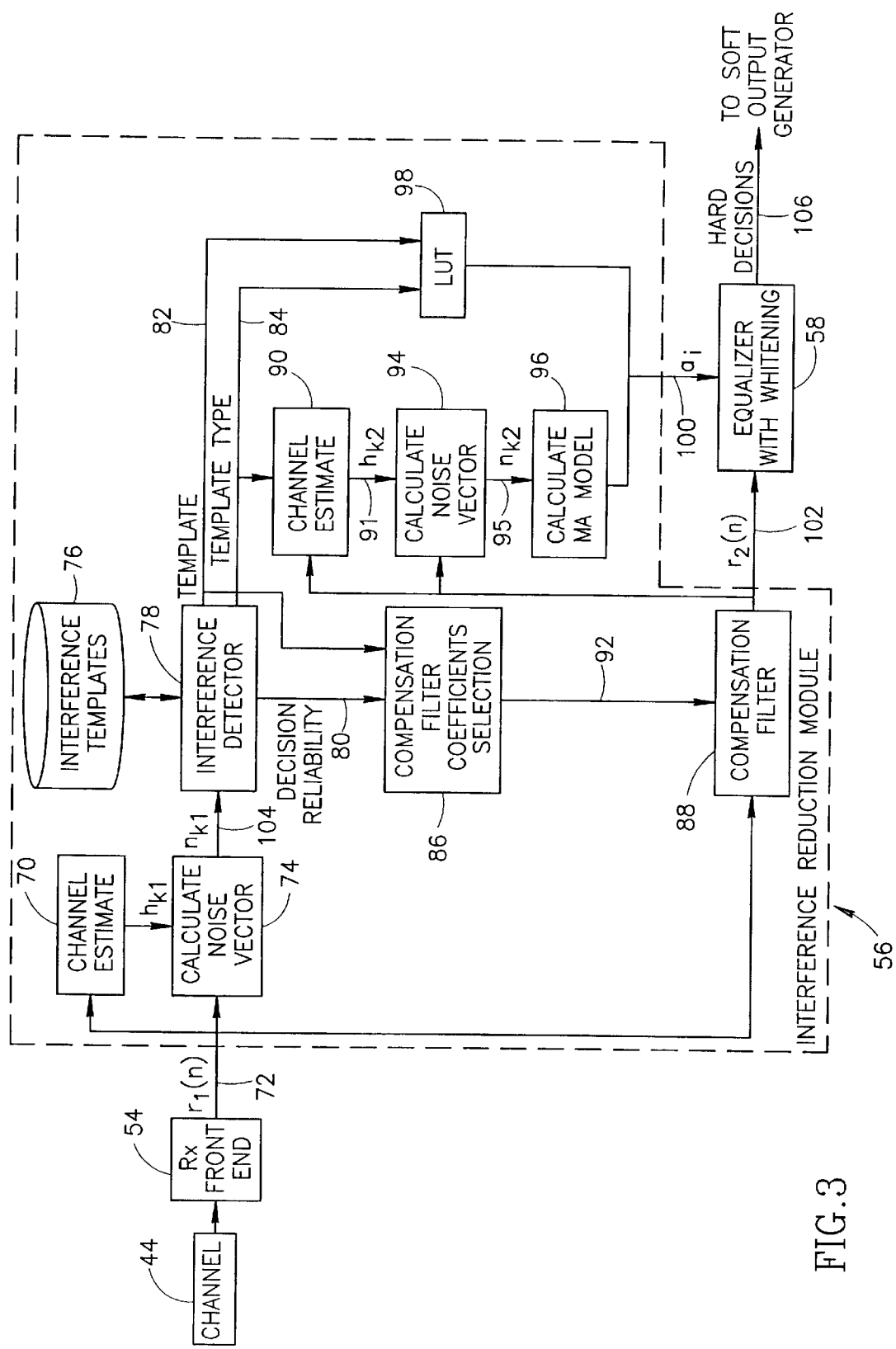
FIG. 3 is a block diagram illustrating the interference reduction module of FIG. 3 in more detail.

The interference reduction module of the present invention will now be described in more detail. A block diagram illustrating the interference reduction module of FIG. 2 in more detail is shown in FIG. 3. Only a portion of the receiver is shown for clarity sake. The signal from the channel 44 is received by the front end circuitry 54 which is operative to generate a received signal $r_1(n)$ 72. The output of the interference module, generally referenced 56, is used by the equalizer with whitening capability 58 to generate hard symbol decisions 106. The equalizer is adapted to use the noise whitening coefficients generated by the interference reduction module.

Soft output is subsequently optionally generated using a soft output generator 59 (FIG. 2). A soft symbol generator suitable for use with the present invention is described in detail in U.S. Patent Application entitled "Soft Decision Output Generator," cited supra. The output of the soft decision generator is then input to the soft outer decoder 60. If the equalizer used is adapted to generate soft decisions, the output is input directly to the soft outer decoder without the need for the soft symbol generator.

The interference reduction module of the present invention utilizes two techniques for reducing the interference present in the received signal. The two techniques may be used alone or, preferably, in combination to maximize the reduction in interference. Both techniques make use of an interference detector which functions to analyze a noise vector extracted from the received signal and compare it to a plurality of predetermined interference templates. The interference template yielding the best match is subsequently used to choose the best coefficients which are used by a compensation filter (i.e. post receive filter) to increase the signal to interference ratio and/or to derive the noise whitening coefficients used by the equalizer.

Note that the types of interference the invention attempts to handle can be grouped into two categories: (1) interference having statistics dependent on the characteristics of the channel model, i.e. adaptive type interference; and (2) interference whose statistics are independent of the characteristics of the channel model, i.e. deterministic type interference.

Typically, modem receivers comprise a rejection filter commonly called the receive filter. The receive filter functions to reject out-of-band noise, e.g., thermal, etc., Thus,.at the output of the receive filter, there are two possibilities. In the first case, the statistic of the noise is known, such as white noise that is colored by the receive filter. In the second case, colored noise remains with only a partially known, i.e. approximated, statistic, such as adjacent or co-channel interference wherein the statistical properties are known only if the interfering signal does not pass through a disturbance changing media such as a fading channel.

In accordance with the invention, the first task is to find the channel estimation taps and then find the noise vector. In one aspect of the invention, the noise vector is then used to find noise whitening coefficients of the noise statistic moving average model. A problem arises, however, in that the noise vectors are of limited length, and thus are not sufficient to produce adequate statistics for accurate determination of the noise statistic moving average model parameters. The noise vectors are limited due to the finite length of the training sequence, e.g., the training sequence in a GSM burst comprises only 26 symbols. Being limited only to the training sequence, the moving average module would have to be evaluated using far fewer parameters then could be used in a real world environment. This causes degradation due to non-ideal estimation of the statistic model parameters. Therefore, in the case of noise having a known interference statistic, i.e. an interferer having a white Gaussian noise statistic at a point before the receive filter, it is better to use the known interference statistic as parameters for noise prediction.

In the case of cellular and other kinds of wireless and non-wireless communications, however, the type of interference that will be received cannot be predicted based on past data samples. To overcome this, the present invention employs an interference detector which functions to identify the type of interference present in the receive signal.

The input to the interference detector is a noise vector derived from the receive signal. In most cases, the various types of interferences can be classified for a limited number of types wherein each type comprises unique characteristics. Two characteristics are used by the present invention to identify interference: power spectrum and autocorrelation sequence coefficients. For some of the types the interference can be characterized exactly and for others only approximated.

The invention is operative to first find the channel estimation and the noise vector from the receive signal. Then, an interference detector is used to choose an appropriate compensation filter and select between adaptive and deterministic moving average models for noise prediction. After compensation filtering a new channel estimate and noise vector is calculated. The new noise vector is used to determine noise whitening coefficients if the adaptive model is used. In the deterministic model case, the coefficients do not need to be calculated since they are already known, having been calculated a priori. The coefficients are then used in an equalizer such as a Viterbi algorithm based equalizer. Note that the present invention is effective to improve the performance of the receiver in presence of residual interference having a well defined spectrum.

In order to arrive at a correct decision, in one alternative embodiment of the invention, the noise vector is filtered using a plurality of matched filters each matched to the power spectrum of one type of interference and a decision is made in accordance with the interference whose matched filter yields the maximum energy at its output. Note that the power spectrum of an interference type may be derived from the Fourier transform of its autocorrelation. In another alternative technique, the autocorrelation of the noise vector is calculated and its distance measured from all previously classified types of interference correlation vectors. The interference yielding the closest match is selected. Note that this alternative technique yields decisions having a higher degree of success and thus the preferred technique.

Once the type of interference is selected, a decision is then made whether (1) to use an adaptive calculation of the moving average (MA) model parameters for noise prediction (i.e. using the least squares algorithm, for example) or (2) to use the parameters previously derived from the characteristics of the particular interference type. The latter decision is the deterministic decision while the former is the adaptive decision. As mentioned previously, not all the characteristics measured will be accurate, thus for these types of interferences the deterministic model is preferable. Otherwise, the adaptive model calculation is performed.

Prior to the selection between adaptive and deterministic moving average models for noise prediction, the interference detector is used to choose a linear compensation filter (i.e. post receive filter or post sampling filter) that is capable of improving the signal to interference ratio (SIR) without significantly increasing ISI. For example, if the noise has been colored by the receive filter, a compensation filter can be used whose spectrum is inverse to that of the receive filter with the result being whitening of the noise and a decrease of ISI. In the case of adjacent interference, it may be desirable to use narrow compensation filtering. Note that if the interference detector makes a wrong decision about the interference, then using a compensation filter will cause a degradation in performance. Therefore, a reliability metric is generated along with the interference determination. If the reliability metric is below a threshold, the compensation filter is adapted to be essentially an all pass filter.

There exist in cellular environments various types of interference. For example, co-channel, adjacent and thermal noise. It is assumed, however, that the statistic of the interference signal is known, when the channel is considered a pass through receive filter and the interference statistic is constant. For example, co-channel interference has the same power spectrum and autocorrelation as the main transmitted signal or the transmitted signal of other cellular systems. The same scenario is true for the case of adjacent channel interference except that the spectrum is shifted to an adjacent frequency band.

For thermal noise, for example, however the exact statistic can be obtained. The statistic comprises the statistic of the white noise filtered by the receive filter. For co-channel and adjacent channel interference, the statistic can only be approximated because the interference signal passes through a cellular channel which disturbs the signal and changes its statistics.

When the channel can be considered a pass through receive filter, a constant statistic for the interference statistic can be used. Otherwise, the mean statistic of the interference signals passing through a plurality of different cellular ISI channels is used.

Determination of the Noise Vector

The first step is to generate an estimate of the channel from the received signal generated after it is passed through an initial receive filter in the receiver front end circuit 54. The channel estimation 70 is operative to generate a channel estimate $h_1(k)$ that is generated using the received input samples $r_1(n)$ 72 and a training sequence $f(k)$.

Several methods of channel estimation that are known in the art and suitable for use with the present invention include, for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998, pages 631–636. The least square method of channel estimation is described in more detail in the articles "Improved Channel Estimation With Side Information," A. S. Khayrallah, R. Ramesh, G. E. Bottomley, D. Koilpillai, EEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11: Method of Least Squares.

Another channel estimation technique suitable for use with the present invention is described in U.S. patent application Ser. No. 09/616,161 to Yakhnich et al, filed Jul. 14, 2000, entitled "Method of Channel Order Selection and Channel Order Estimation in a Wireless Communication System," cited supra.

The channel estimate is used in combination with the received input samples $r_1(n)$ 72 to calculate a noise vector $n_{k1}$ 104 using block 74. Once the channel estimation taps are known, such as when a training sequence is available, e.g., GSM, etc., they are used to obtain the noise vector $n_{k1}$. The noise vector is subsequently used to obtain the noise whitening coefficients denoted $a_i$ (i.e. the noise whitening statistic) which is later used in approximating the noise using the moving average model.

The input receive samples can be modeled by the following equation $$y_k = \sum_{i=0}^{L-1} h_i \cdot s_{k-i} + n_{kI} \tag{1}$$

where $y_k$ represents the $k^{th}$ input sample to the inner decoder (i.e. the equalizer;

$S_{k-i}$ represents the k-$i^{th}$ symbol of the known training sequence;

$h_i$ represents the channel estimate;

$n_{k1}$ represents the zero mean additive white Gaussian noise.

The vector of noise values can be then be calculated using $$n_{k1} = y_k - \sum_{i=0}^{L-1} h_i \cdot s_{k-i} \quad (2)$$

wherein L represents the length of the channel estimate.

A Priori Determination of Interference Templates

Once the noise vector is found, it is used to find the statistic of the interference signal. As described previously, the interference detector functions to compare the noise vector with previously generated statistics of various possible types of interference likely to be encountered. These interference statistics are generated and stored as interference templates in a storage device 76 such as a database or table stored in memory, e.g., RAM, ROM, NVRAM, magnetic memory, etc.

Figure 4:
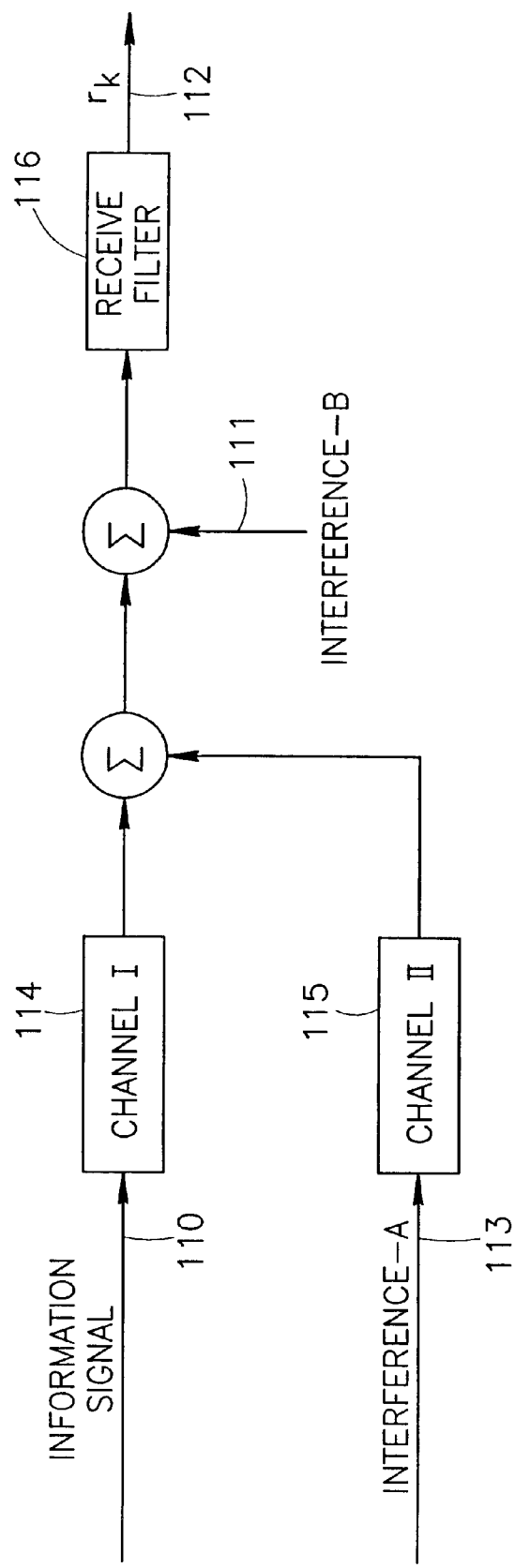
FIG. 4 is a diagram illustrating generating interference templates using deterministic and adaptive techniques.

A diagram illustrating the generation of the interference templates is shown in FIG. 4. The invention is operative to generate interference templates having (1) constant statistics of deterministic types of interference and (2) mean statistics of adaptive types of interference.

Constant statistics are found by injecting a typical interference signal at the Interference-B point before the receive filter 116 (i.e. the channel is modeled as a pass through receive filter). The changes in the interference signal received at the output of the receive filter are deterministic since they do not pass through the channel 114 in this case. Thus, interference 111 added at the Interference-B point are deterministic since they are added after the channel. An autocorrelation of the samples $r_k$ 112 output of the receive filter is taken. Note that in this case the interference noise is always colored in a similar way by the receive filter. One of the most common examples of deterministic interference is an AWGN signal. The autocorrelation of the samples of this kind of interference at the output of the receive filter will be the same as an autocorrelation of the filter taps of the receiver.

Mean statistics are used to approximate the statistic of the interference. This technique is used to determine the templates for adaptive type interference such as co-channel and adjacent channel interference since the interference signal 113 passes through an ISI channel (i.e. channel II 115) before being injected into the receiver filter input. A series of readings of the receive filter output is taken over as many different ISI channels as possible. Very long input signals can be used and the output of the receive filter measured over the course of days, weeks or longer. Each interference vector can be randomly chosen as long as it is within the power spectrum of the particular type of interference whose template is being generated. For each interference type, the output samples are taken as if they were noise vector samples and processed as described in Equations 3 and 4 below for computation of the autocorrelation coefficients. The results for each channel used are saved and after the last signal for that type is injected, the mean of all the autocorrelation sequences is computed. Note that using this technique, the variance of the autocorrelations should be close to the variance of the channel. This is repeated for each interference type for which a template is desired.

Alternatively, a signal burst (i.e. information signal 110) comprising a training sequence is repeatedly injected at a point before the channel together with the interference signal 113 injected at point Interference-A (i.e. adaptive types of interference) or Interference-B (i.e. deterministic types of interference). The mean statistic of the interference is then determined after many signal bursts are injected at the particular interference point. Only the portion of the signal burst containing the training sequence is considered. For each case, the output of the receive filter is used to find the noise vector using Equation 2. The autocorrelation of the noise vector then determinated using Equations 3 and 4 below. The mean of the autocorrelations of the noise vectors is then used in determining the noise whitening statistics $a_i$.

Either the autocorrelation or power spectrum of the interference can be used as its statistic. Both are described below. Note that the following is used to determine both the statistic of the noise vector derived from the receive signal and the interference templates that are calculated a prior before operation of the interference reduction module.

By definition, the power spectrum is the Fourier transform of the autocorrelation sequence. Thus, both represent the interference essentially equivalently. The autocorrelation estimate of the N-sample noise vector can be found using $$a_i = \sum_{k=0}^{N-1-i} r_{k+i} \cdot r_k \quad (3)$$

where $a_i$ represents the $i^{th}$ coefficient of the autocorrelation of the noise vector;

$r_k$ represents the $k^{th}$ sample of the noise vector samples.

Note that to make the autocorrelation of the noise vector independent of the noise power, the coefficients must be normalized by the noise power estimate as follows $$C_i = \frac{a_i}{z_0} \quad (4)$$

where $a_i$ represents the $i^{th}$ coefficient of the autocorrelation of the noise vector;

$a_0$ represents the $0^{th}$ coefficient of the autocorrelation of the noise vector or equivalently the noise power;

$C_i$ represents the $i^{th}$ coefficient of the autocorrelation of the normalized autocorrelation;

Interference Detector Decisions

With reference to FIG. 3, the interference detector 78 functions to first generate the statistic (i.e. the autocorrelation or power spectrum) of the noise vector $n_{k1}$ of the receive signal input thereto using Equations 3 and 4 described supra. It then compares the statistic of noise vector with all the interference templates, representing the interference statistics, previously calculated and stored in the database 76. The interference template that best matches the statistic of the noise vector is selected.

The following equation is used to calculate the distance between each candidate interference template and the statistic of the noise vector.

$$RI = \sum_{k=0}^{N-1}(C_k - CI_k)^2 \tag{5}$$

where

RI represents the distance between the statistic of the noise vector and the statistic of the $l^{th}$ type of interference;

$C_k$ represents the $k^{th}$ coefficient of the normalized autocorrelation of the noise;

$CI_k$ represents the $k^{th}$ coefficient of the normalized autocorrelation of the $i^{th}$ type of interference;

N represents the autocorrelation sequence length;

The autocorrelation distances from all the various types of interference are found using Equation 5. The type of interference yielding the minimum distance between the autocorrelation sequences is chosen. A reliability metric is also computed that shows an indication of how close the template yielding the minimum distance was to the template yielding the second minimum distance. If the minimum distance is sufficiently far from the second minimum distance, it is assumed that there is a high probability that interference corresponding to the template yielding the minimum distance is present in the receive signal. Information about the interference is used subsequently in determining the compensation filter coefficients.

Note that the case where there is a mix of different interferecnes, or one or more new types of interferences are present, ususaly results in a low reliability metric as in one of either two cases: (1) the distances to the minimum and the second minimum interferences are nearly equal meaning $$\text{decision\_reliability} = \frac{RI_{\min(2)}}{RI_{\min}} < threshold \tag{6}$$

where the threshold may be set to any suitable level such as 1.2, for example, or (2) all the distances are very large meaning $$\text{decision\_reliability} = \frac{RI_{\min(2)}}{RI_{\min}} = \frac{RI_{\min} + \Delta}{RI_{\min}} \approx 1 < threshold \quad \Delta \ll RI_{\min} \tag{7}$$

where deta ($\Delta$) represents the difference between the minimum and second minimum distances.

An alternative to the interference detection technique described supra is to determine the power spectrum for each type of interference from its autocorrelation properties. Using the power spectrum of each interference type, a matched filter can be constructed. The matched filter constructed is a filter having substantially the same power spectrum as the spectrum of the interference. It can be constructed, for example, by inserting the desired frequency response as input to any suitable FIR filter construction algorithm as in well known in the art. For example, the Parks-McClellan algorithm described in J. H. McClellan and T. W. Parks, "A Unified Approach to the Design of Optimum FIR Linear Phase Digital Filters," IEEE Transactions on Circuit Theory, Vol. CT-20, pages 697–701, November 1973, incorporated herein by reference.

The noise vector obtained from the receive signal is then passed through a bank of these matched filters wherein each of the filters is matched to a specific interference. The energy output of each filter is measured and the type of interference yielding the maximum energy is chosen. The reliability metric is also calculated to indicate the degree of closeness between the filter yielding the maximum energy and the filter yielding the second maximum energy. A small number indicates a low probability of correctness and, depending on the threshold, should not be used to determine the compensation filter coefficients.

Compensation Filter Selection

The interference detector 78 is operative to output the chosen interference template 82, the type of template 84 (i.e. either deterministic or adaptive) and a metric 80 indicative of the reliability of the decision. The particular interference template and its associated reliability are used to determine the coefficients for a compensation filter 88 that is used to filter the received signal $r_1(n)$ 72.

Ideally, an optimal receive filter can be found and used in the receiver for each given interference, thus resulting in significantly better performance. Since the receive filter cannot be chosen before the type of the interference present is known, a compensation or post filter is used as the next best alternative. The optimal receive filter can only be found after sampling the receive signal which is performed after the receive filter in the Rx front end. For example, if it is found that most of the noise energy is on one side of the spectrum then it would be desirable to use a narrow receive filter at the input.

Thus, a key aspect of the present invention is to find a receive filter that maximizes the signal to interference ratio in the presence of various types of interference while keeping ISI as small as possible, especially when a Viterbi Algorithm based equalizer is used after the compensation filter.

In accordance with the invention, the receive filter is fixed and is used for all types of interference, since it is not possible to determine the type of the interference before the receive filter. After the receive filter, however, the signal can be sampled and the samples used to find the necessary parameters to detect the type of interference present. The output of the interference detector comprises a determination of the type of interference. Thus, for each specific interference a compensation filter can be used whose impulse response convoluted with the impulse response of the receive filter yields an impulse response as close to the desired response as possible.

The compensation filter is chosen using selection block 86. For each interference type a different compensation filter (or post filter) is chosen. The coefficients are optimally determined off line a priori via trial and error and experimentation. The compensation filter coefficients that yield the most improvement are chosen. Test data is used and a suitable metric, such as Bit Error Rate (BER), is used to choose the best filter for each interference. Note that preferably, the BER is measured with the equalizer in the path with the whitening procedure described herein. Note that for some cases such as white noise colored by the receive filter, the inverse of the receive filter that results in simultaneous maximum ISI reduction and noise whitening is used.

As an example, consider the case of adjacent channel interference. We start with some form of narrow filter. Next, the filter is either slightly narrowed or widened depending on the improvement in the performance of the receiver. Narrowing the filter causes more ISI but more interference noise is rejected. Ultimately, the compensation filter yielding the best performance is chosen.

Note that if the interference detector makes a wrong decision then the use of the wrong compensation filter is likely to cause a major degradation in performance. Therefore, the reliability metric 80 generated by the interference detector is used to indicate if the decision has a high probability of correctness. In the case of low probability, it is better not to use the compensation filter at all. In this case, coefficients representing an all pass filter are used. Alternatively, a compensation filter is used that is suitable for many different types of interference but is far from optimal for each. Note that low probability can be determined when the reliability metric is below a particular threshold, the threshold being set by trial and error for the particular implementation.

Once the filter coefficients 92 are selected, the compensation filter 88 is operative to filter the receive signal 72 to yield a filtered receive signal designated $r_2(n)$ 102. This signal is subsequently input to the equalizer 58 and is also used in the evaluation of the moving average model.

Note that a main benefit of using a compensation filter is that in cases when the ISI is relatively low the interference can be greatly reduced. Moreover, a high signal to noise ratio can be achieved in the case of white noise at the input to the receive filter since the mechanism is operative to use an inverse of the receive filter, which whitens the noise. Further, the invention permits a tradeoff between permissible ISI and level of interference. For example, an increased signal to interference ratio can be achieved in the presence of adjacent channel interference by setting a narrow compensation filter. Although this increases ISI, the invention is effective to greatly reduce the interference, which is usually the more desirable tradeoff.

Determination of Noise Whitening Coefficients— Moving Average Model

As described supra, the invention is operative to determine noise whitening coefficients that are used by the equalizer with whitening to whiten the signal subsequently input to the soft outer decoder and to remove interference noise from the signal as best as possible. The noise whitening coefficients are determined using a moving average model. In accordance with the invention, if the interference detector chooses a deterministic interference type, the coefficients can be calculated a priori and stored in a database or look up table. If the interference detector chooses an adaptive interference type, the coefficients are calculated on the fly using a moving average model as described infra.

Thus, the template type 84 determines which path the process takes. For deterministic template types, the coefficients are retrieved from a database or look up table (LUT) 98 using the specific interference template as the index. Otherwise, they are calculated using the moving average model calculation block 96. Both paths, however, yield a set of coefficients $a_i$ 100 used by the equalizer 58.

As described previously, the ISI in the received signal must be treated by some form of equalization such as MLSE that utilizes the well known Viterbi Algorithm. Another consideration is the degree of whiteness of the noise and its Gaussian distribution of noise other than ISI. The main goal of the filters in the receiver is to maximize the signal to interference ratio while keeping ISI as small as possible. Secondly, to employ interference suppression in an attempt to remove interference from the receive signal before a data decision is made. A suitable noise cancellation technique comprises attempting to decorrelate the noise as much as possible. A nonlinear technique may be used for the purpose of approximating the noise known as the moving average (MA) statistic model which can be expressed as $$\tilde{n}_k = \sum_{i=0}^{L-1} a_i \cdot n_{k-i-1} \tag{8}$$

where $n_{k-i}$ represents the k-$i^{th}$ colored noise sample value;

$\tilde{n}_k$ represents the $k^{th}$ predicted colored noise sample value;

$a_i$ represents the noise whitening coefficients of the moving average noise statistic model;

Note that the goal is to determine the noise whitening coefficients $a_i$.

The noise vector is used in evaluating the moving average model. Therefore, the channel estimate 90 is again taken but this time, it is taken on the filtered receive signal $r_2(n)$ 102. The operation of the channel estimation 90 is similar to that of the channel estimation 70 described supra.

The noise vector calculation 94 is then performed using the channel estimate $h_{k2}$ 91 and the filtered receive signal $r_2(n)$ 102 in accordance with Equations 1 and 2 so as to yield a colored noise vector $n_{k2}$ 95 which is different from the noise vector calculated using block 74. The colored noise vector $n_{k2}$ is then used to calculate its moving average model parameters. A suitable technique for achieving this is to use the Least Squares estimation algorithm. It is appreciated that one skilled may utilize other well known techniques as well. Note that this method of calculating the model parameters is usually more accurate than the alternative look up method since in this method, the parameters are derived from the current channel.

For the purposes of Least Squares estimation, the linear model described in Equation 8 is considered and rewritten in matrix form as $$\begin{bmatrix} ntrn_k \\ ntrn_{k+1} \\ \ldots \\ ntrn_M \end{bmatrix} = \begin{bmatrix} ntrn_{k-1} & ntrn_{k-2} & \ldots & ntrn_0 \\ ntrn_k & \ldots & \ldots & ntrn_1 \\ \ldots & \ldots & \ldots & \ldots \\ ntrn_{M-1} & \ldots & \ldots & ntrn_{M-k} \end{bmatrix} \begin{bmatrix} a_0 \\ a_1 \\ \ldots \\ a_{k-1} \end{bmatrix} + \begin{bmatrix} v_0 \\ v_1 \\ \ldots \\ v_{k-1} \end{bmatrix} \tag{9}$$

where ntrn represents the calculated noise vector such as $n_{k2}$ 95. This model can be expressed alternatively as $$\underline{N} = N\underline{\hat{a}} + \underline{v} \tag{10}$$

where $\underline{N}$ represents the colored noise vector;

$N$ represents convolution matrix of colored noise values;

$\underline{\hat{a}}$ represents the noise whitening coefficients of the noise statistic moving average model;

$\underline{v}$ represents the error of the model.

Given the estimate of the colored noise vector, the estimate of the noise whitening coefficients $\underline{\hat{a}}$ can be calculated by minimizing the square error between $\underline{N}$ and an estimate of $\underline{N}$ as expressed below $$\underline{v} = (\underline{N} - N\underline{\hat{a}}) \cdot (\underline{N} - N\underline{\hat{a}})^H \tag{11}$$

It can be easily shown that for AWGN, the Least Squares estimate is equivalent to the Maximum Likelihood estimate. The minimization of Equation 11 leads to a solution of the form $$\underline{\hat{a}} = F^\# \underline{N} \tag{12}$$

where $F^\# = (N^H N)^{-1} * N^H$ is a pseudo inverse matrix.

Once the noise whitening coefficients â 100 are calculated, they can be used by the equalizer to predict the present noise value and subtract it from the receive signal before a decision on the data is made.

Figure 5:
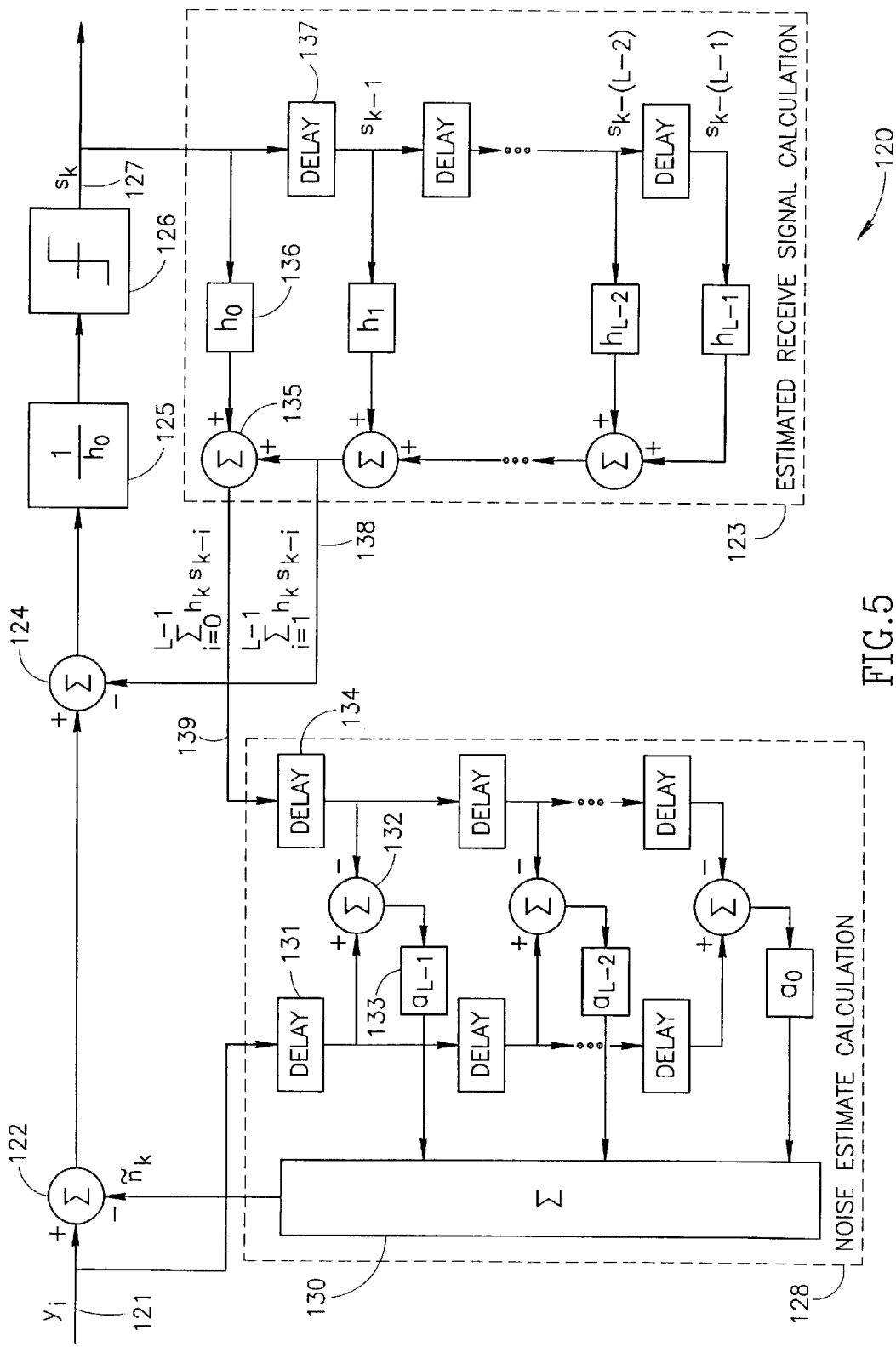
FIG. 5 is a block diagram illustrating an example decision feedback equalizer (DFE) incorporating noise cancellation.

As an example, the nonlinear equalization technique known as MLSE is applicable when the mobile radio channel can be modeled as a Finite Impulse Response (FIR) system. This equalization technique can be combined with the interference reduction technique of the present invention described herein. A block diagram illustrating an example decision feedback equalizer (DFE) incorporating noise cancellation is shown in FIG. 5.

The DFE, generally referenced 120, comprises a slicer 126 that functions to output decisions $s_k$ 127 which are fed back to calculation block 123 which is operative to calculate the estimated received signal 139 by the convolution of the slicer output decisions $s_k$ 127 with the channel estimate $h_k$ as given by $$\sum_{i=0}^{L-1} h_k s_{k-i}.$$

The convolution is generated using delayed versions of the slicer output delayed via delay registers 137. The slicer output and the delayed output decisions are multiplied by the channel estimate coefficients $h_0 \ldots h_{L-1}$ via blocks 136. The products are summed via summers 135 to generate the estimated received signal 139 which is input to the noise estimate calculation 128 for calculation of the noise estimate.

Since it is desired to remove the effects of previous symbols, the contribution of the L–1 symbols is subtracted from the input via subtractor 124. Therefore, the convolution $$\sum_{i=1}^{L-1} h_k s_{k-i}$$

using channel estimate coefficients $h_1 \ldots h_{L-1}$ is generated (signal 138) and subtracted from the input sample. Since the noise was already removed via subtractor 122, the output of subtractor 124 yields $h_0 s_k$. The first channel coefficient $h_0$ is removed by dividing by $$\frac{1}{h_0}$$

via block 125. The result is input to the slicer 126.

The input $y_i$ 121 also passes through a series of delay registers 131 in the noise estimate calculation block 128. The delayed received signal estimates are then subtracted from the delayed input $y_i$ via subtractors 132. The error difference is then multiplied by coefficents $a_0 \ldots a_{L-1}$ via blocks 133. The products generated are then summed by adder 130. The sum of the products represents the current noise $\tilde{n}_k$. This noise is then subtracted from the input samples $y_i$ via subtractor 122.

Thus, the noise estimate calculation block 128 is operative to utilize the past decision of the slicer in determining the present decision. The colored noise value samples are stored and the noise whitening coefficients $a_i$ are used in accordance with Equation 8 to calculate an estimate of the present noise $\tilde{n}_k$ before the slicer makes the next decision. The noise estimate is then subtracted from the input signal $y_i$ via summer 122 so as to generate a whitened input sample $Y_i$ using $$Y_i = y_i - \tilde{n}_i \tag{13}$$

where $Y_i$ represents the $i^{th}$ received whitened sample of the input signal input to the slicer;

$y_i$ represents the $i^{th}$ received non-whitened sample of the input signal;

$\tilde{n}_i$ represents the $i^{th}$ estimated colored noise sample value;

It is important to note that $\tilde{n}_i$ is only an estimate (i.e. a prediction) of the noise that is used to calculate $Y_i$ and is different from $N_i$ which is subsequently calculated. Next, $Y_i$ is used as the input signal to a conventional DFE slicer which makes a decision on the data in accordance with the following $$n_i = \min_{Mj} \left\{ Y_i - Mj \cdot h_0 - \sum_{i=1}^{L-1} h_i \cdot s_{k-i} \right\} + \tilde{n}_i \tag{14}$$

wherein $d_k$ is chosen in accordance with the $M_j$ that yields a minimal $n_i$ $$d_i = Mj(n_i) \tag{15}$$

and where $n_i$ represents the $i^{th}$ colored noise sample value which will be used in Equation 8;

$d_i$ represents the $i^{th}$ hard symbol decision;

$Y_i$ represents the $i^{th}$ received whitened sample of signal input to DFE;

Mj represents J$^{th}$ symbol from all possible alphabet symbols;

$S_{k-l}$ represents the k-i$^{th}$ hard symbol decision;

$h_i$ represents the $i^{th}$ tap of the channel estimate;

It is appreciated by one skilled in the art that the above algorithm is not limited to use with DFE type equalizers but can be used in any sequence detector such as in a Viterbi Algorithm based equalizer. In a Viterbi Algorithm based equalizer, the noise values can be stored per state or per survival, for example.

Note also that the technique described herein requires knowledge of the tap values of the channel impulse response and values of the noise whitening coefficients as calculated using the noise statistic MA model. The channel impulse response tap values can be obtained using a known training symbol sequence such as that used, for example, in GSM and TDMA cellular systems and other cellular or non-cellular standards.

GSM EDGE Embodiment

Figure 6:
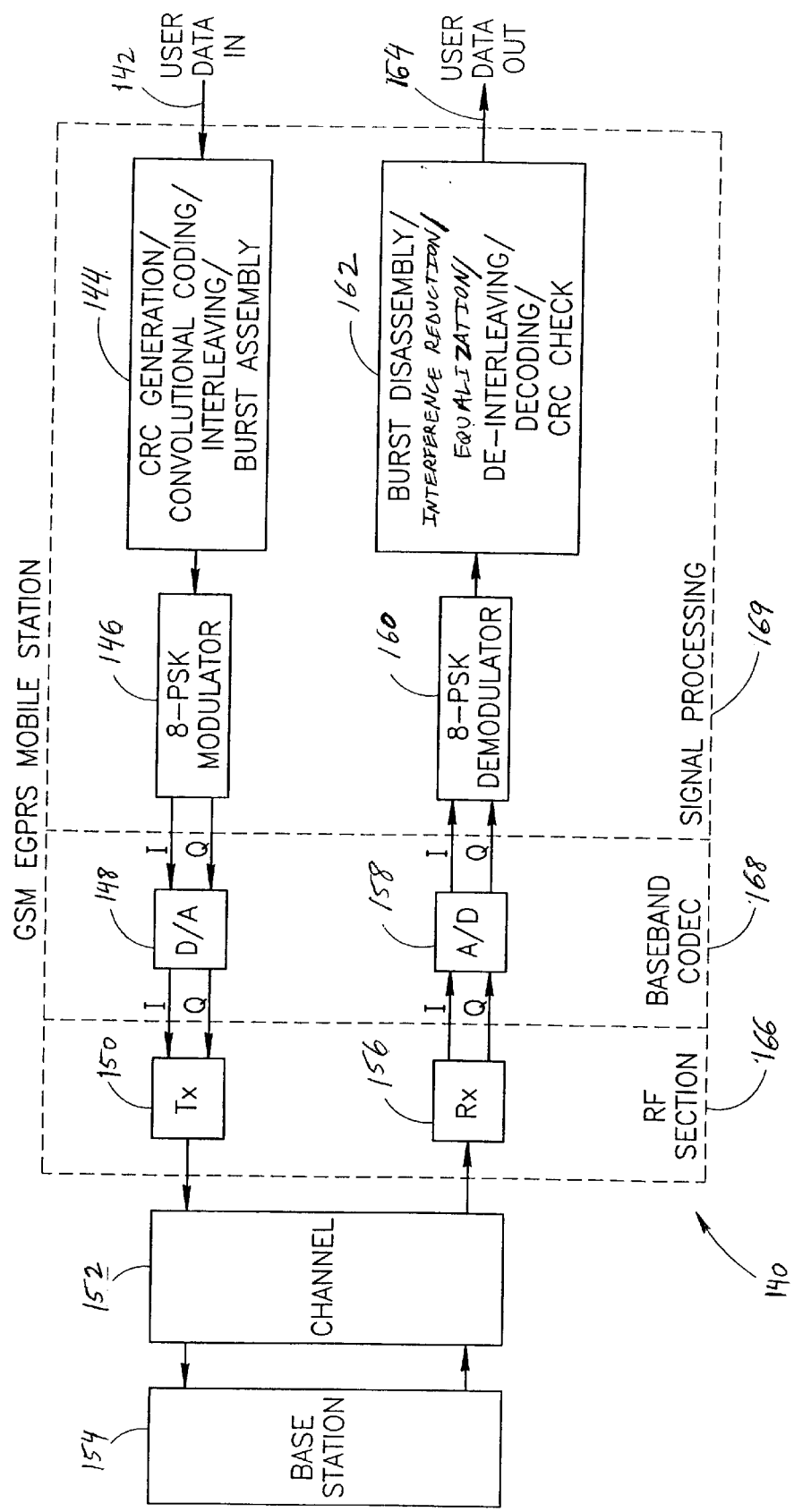
FIG. 6 is a block diagram illustrating the functional processing blocks in a GSM EDGE mobile radio station.

A GSM mobile station constructed to perform the interference reduction method of the present invention is presented. A block diagram illustrating the functional processing blocks in a GSM EDGE mobile radio station is shown in FIG. 6. The radio station is designed to provide reliable data communications at rates of up to 470 kbit/s. The GSM EGPRS mobile station, generally referenced 140, comprises a transmitter and receiver divided into the following sections: signal processing circuitry 169, baseband codec 168 and RF circuitry section 166.

In the transmit direction, the signal processing portion functions to protect the data so as to provide reliable communications from the transmitter to the base station 154 over the channel 152. Several processes performed by the channel coding block 144 are used to protect the user data 142 including cyclic redundancy code (CRC) check, convolutional coding, interleaving and burst assembly. The resultant data is assembled into bursts whereby guard and trail symbols are added in addition to a training sequence midamble that is added to the middle of the burst. Note that both the user data and the signaling information go through similar processing. The assembled burst is then modulated by a modulator 146 which may be implemented as a $3\pi/8$ offset 8-PSK modulator.

In the receive direction, the output of the baseband codec is demodulated using a complementary 8-PSK demodulator 160. Several processes performed by the channel decoding block 162 in the signal processing section are then applied to the demodulated output. The processes performed include burst disassembly, interference reduction in accordance with the present invention, equalization, de-interleaving, convolutional decoding and CRC check. Optionally, soft symbol generation and soft symbol to soft bit conversion may also be performed depending on the particular implementation.

The baseband codec converts the transmit and receive data into analog and digital signals, respectively, via D/A converter 148 and A/D converter 158. The transmit D/A converter provides analog baseband I and Q signals to the transmitter 150 in the RF circuitry section. The I and Q signals are used to modulate the carrier for transmission over the channel.

In the receive direction, the signal transmitted by the base station over the channel is received by the receiver circuitry 156. The analog signals I and Q output from the receiver are converted back into a digital data stream via the A/D converter. This I and Q digital data stream is filtered and demodulated by the 8-PSK demodulator 160 before being input to the channel decoding block 162. Several processes performed by signal processing block, as described above, are then applied to the demodulated output.

In addition, the mobile station performs other functions that may be considered higher level such as synchronization, frequency and time acquisition and tracking, monitoring, measurements of received signal strength and control of the radio. Other functions include handling the user interface, signaling between the mobile station and the network, the SIM interface, etc.

Simulation Results

To illustrate the benefits of the present invention, a GSM Enhanced General Packet Radio System (EGPRS) was simulated and the results are presented herein. The simulation was performed assuming a GSM EGPRS transmitter and 6 tap TU50iFH standard channel in sensitive conditions.

Figure 7:
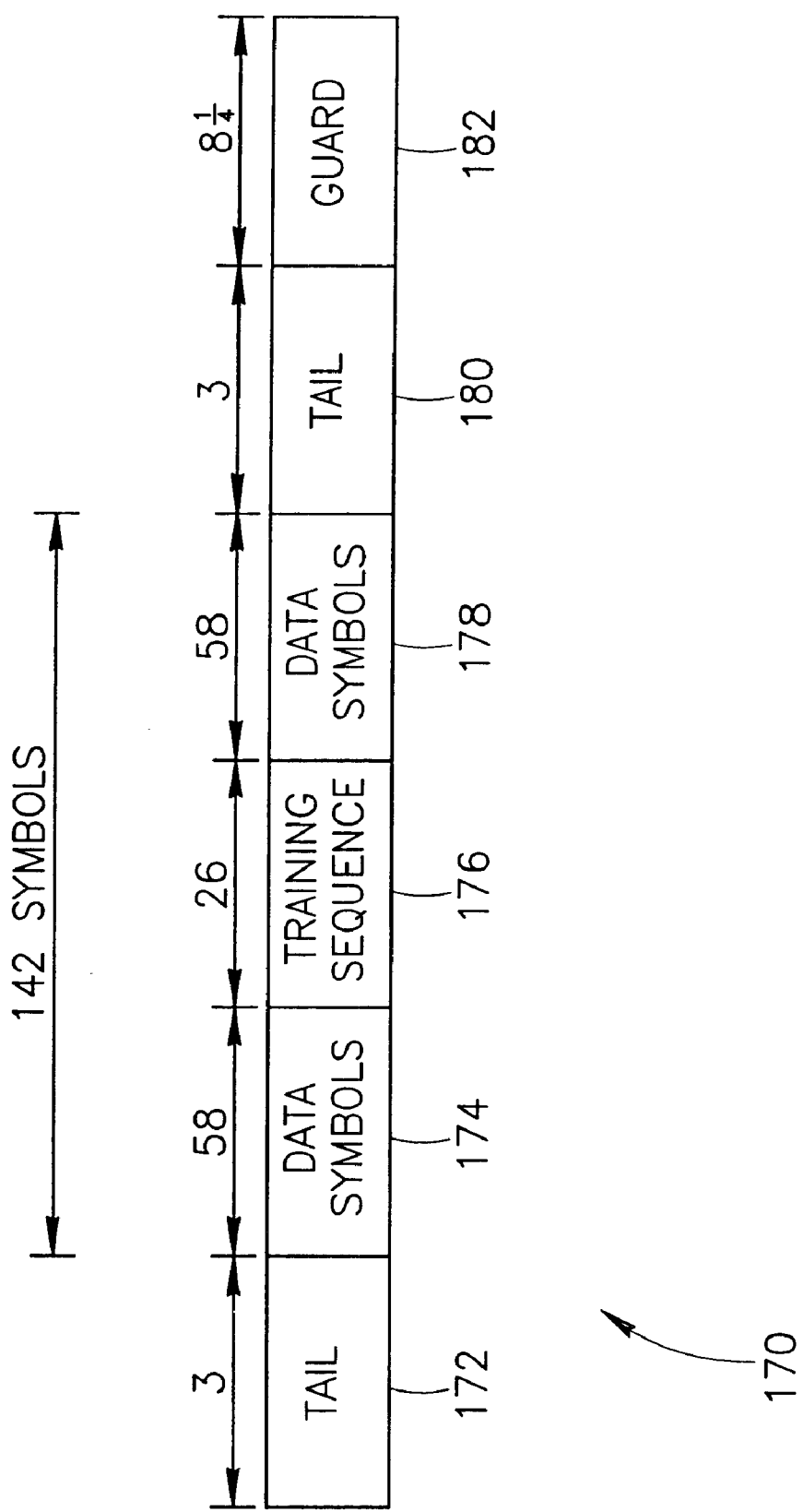
FIG. 7 is a diagram illustrating the elements of a GSM message including tail, data and training symbols.

The EGPRS system is a Time Division Multiple Access (TDMA) system wherein eight users are able to share the same carrier frequency. In an EGPRS transmitter, the data bits are encoded with a rate 1/3 convolutional encoder, interleaved and mapped to 8-ary symbols. The resultant coded data symbols together with the training sequence are assembled into a burst of 142 symbols as shown in FIG. 7.

In GSM, the training sequence is sent in the middle of each burst. Each fixed length burst 170 consists of 142 symbols preceded by a 3 symbol tail 172 and followed by a 3 symbol tail 180 and 8.25 symbol guard 182. The 142 symbols include a 58 symbol data portion 174, 26 symbol training sequence 176 and another 58 symbol data portion 178. Since the training sequence is sent in the middle of the burst, it is referred to as a midamble. It is inserted in the middle of the burst in order to minimize the maximum distance to a data bit thus minimizing the time varying effects at the ends of the burst.

The burst is then modulated using $3\pi/8$-offset 8-PSK with Gaussian pulse shaping in accordance with the GSM standard. The modulated output is transmitted over a frequency selective static Gaussian channel utilizing punctured rate 1/3 convolutional coding. An equalizer operative to generate soft symbol values was used in the receiver. The receiver was adapted to convert the soft symbol information into soft bit information in accordance with the present invention. A soft input Viterbi Algorithm based convolutional decoder was used as the outer decoder. The soft bit values output from the converter were used as input for the soft decoder.

Figure 8A:
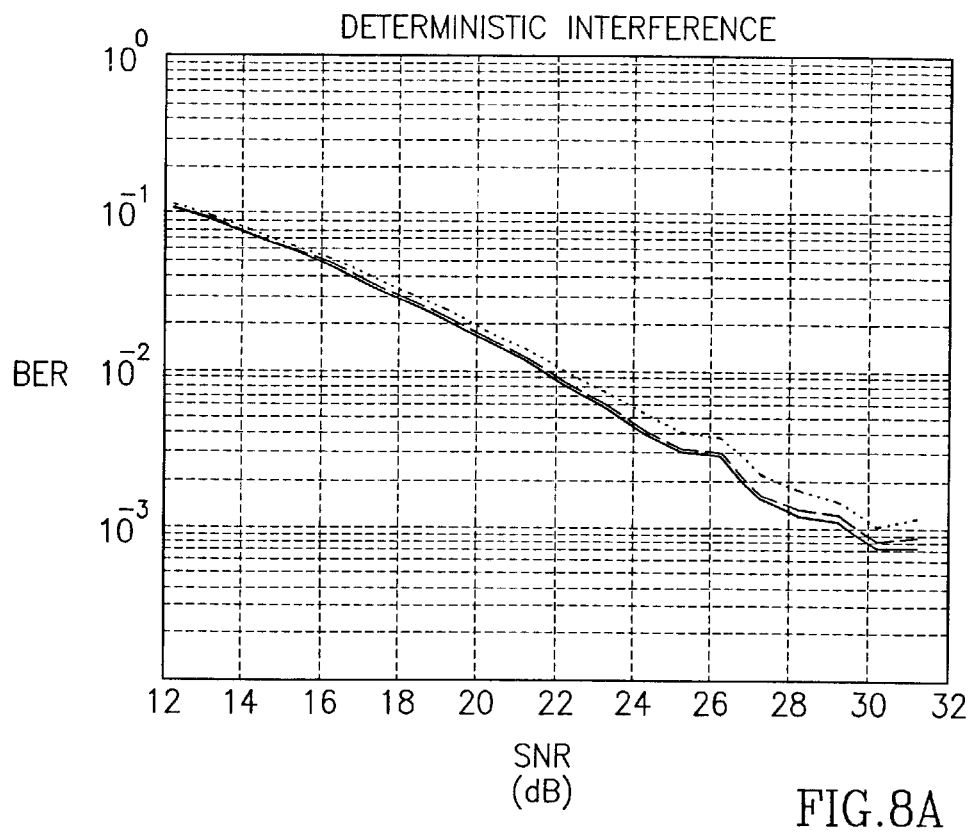
FIGS. 8A and 8B are graphs illustrating simulation results showing BER before convolutional decoding versus SNR for a concatenated communications receiver constructed with and without the interference reduction mechanism of the present invention for adaptive type interference.
Figure 8B:
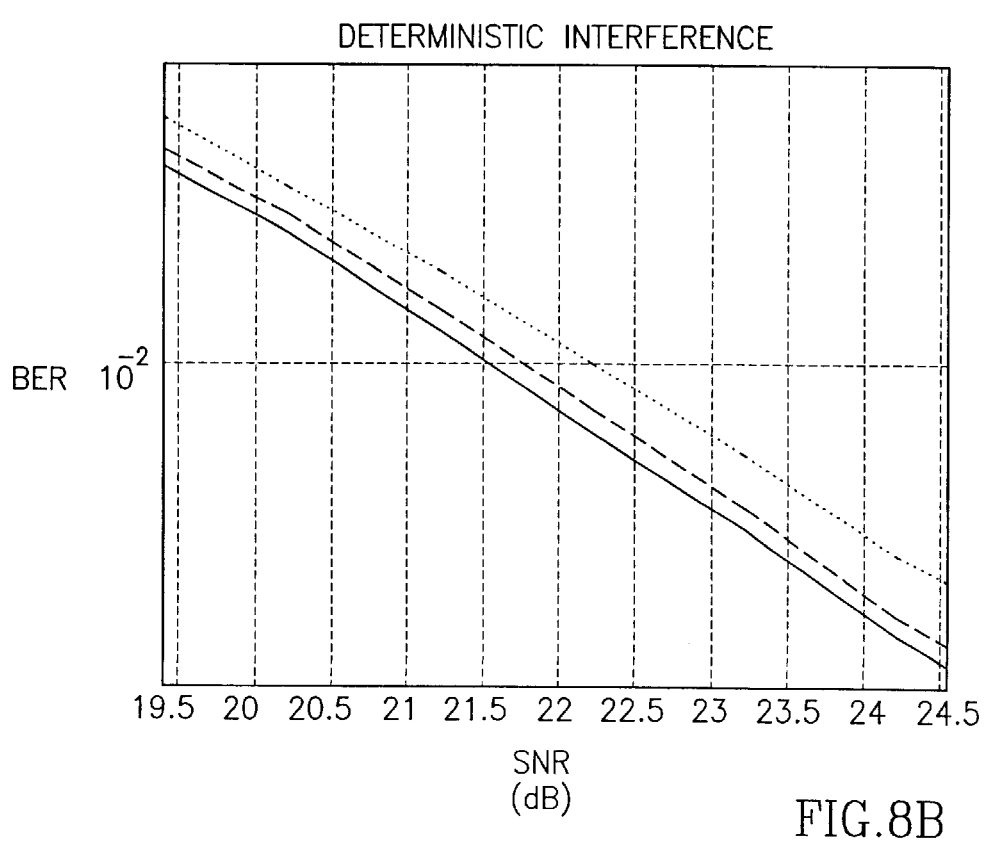
Figure 9A:
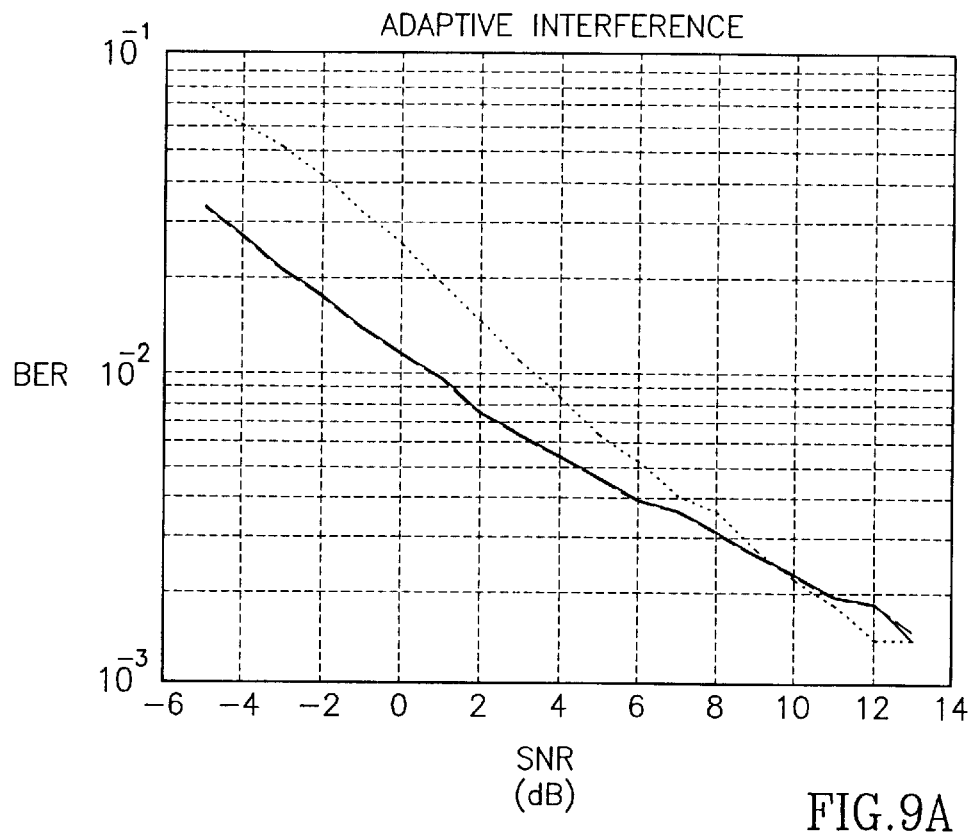
FIGS. 9A and 9B are graphs illustrating simulation results showing BER before convolutional decoding versus SNR for a concatenated communications receiver constructed with and without the interference reduction mechanism of the present invention for deterministic type interference.
Figure 9B:
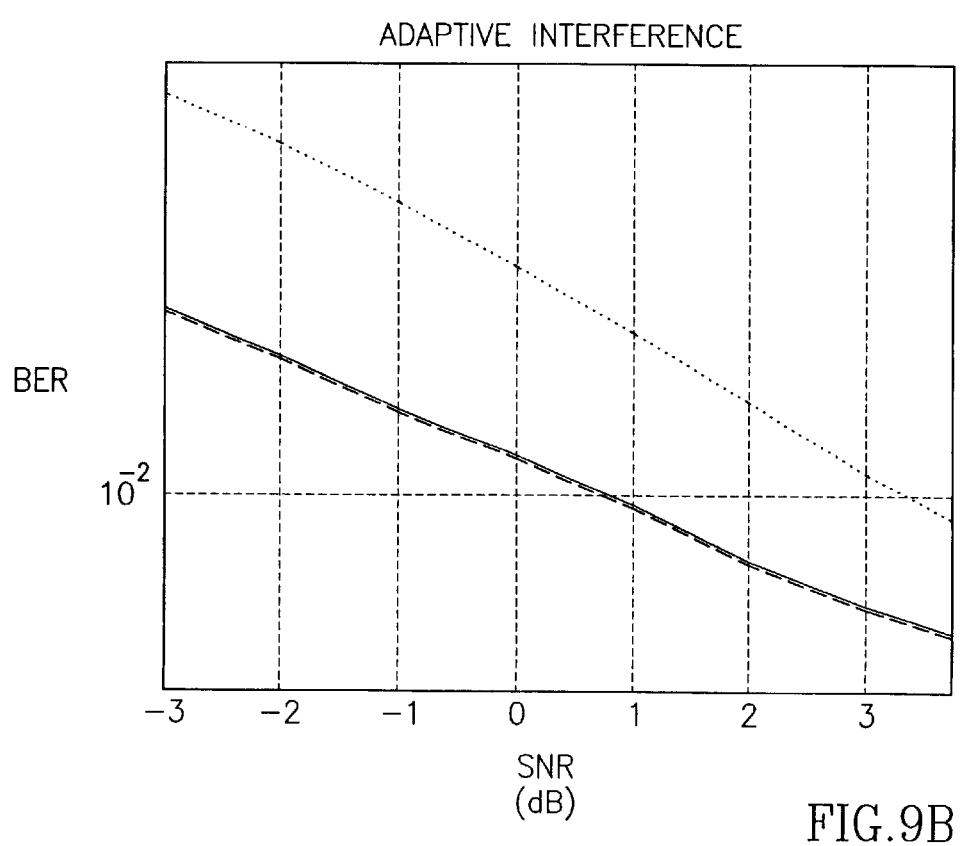

Graphs illustrating simulation results showing BER before convolutional decoding versus SNR for a concatenated communications receiver constructed with and without the interference reduction mechanism of the present invention for adaptive type interference are shown in FIGS. 8A and 8B. Simultion results for deterministic type interference are shown in FIGS. 9A and 9B. Note that FIGS. 8B and 9B show the results in FIGS. 8A and 9A, respecitvely, in more detail.

In all four graphs, the dotted curve is the result without the present invention; the dashed curve is the result using a compensation filter (i.e. post filter) of the present invention only; and the solid curve is the result using the compensation filter combined with the equalizer whose coefficients are calculated using the MA technique (adaptive type interference) or taken from the predefined template (deterministic type interference) as described above. Each curve represents the BER versus SNR and was obtained by taking the bits output of the equalizer (i.e. before convoutional decoding) and comparing them to the actual bits transmitted at the point in the transmitter after convolutional encoding.

It can be seen that, in the case of deterministic (i.e. sensitivity case) type interference (FIGS. 8A and 8B), performance gains of ½ to ¾ dB and better are achieved when the receiver incorporates the interference reduction mechanism of the present invention when compared to a receiver that does not. For example, at a BER of, $10^{-2}$ a performance gain of nearly ½ dB is achieved using only the compensation filter of the present invention. An additional ¼ dB is achieved when the whitening coefficients for the equalizer are determined using the present invention as well. In the case of high SNR, the improvement can be as much as 1 dB while half the improvement can be achieved using the compensation filter alone.

In the case of adaptive interference (e.g. adjacent channel), performance gains of as much 4 dB can be achieved in low SNR using the interference reduction mechanism of the present invention. At higher SNR, the improvement in performance is less.

Thus in accordance with the. invention, the interference detector is effective to improve the calculation of the noise whitening model coefficients resulting in better noise whitening inside the non-linear sequence decision equalizer thus achieving better overall performance of the receiver.

Computer Embodiment of the Interference Reduction Mechanism

Figure 10:
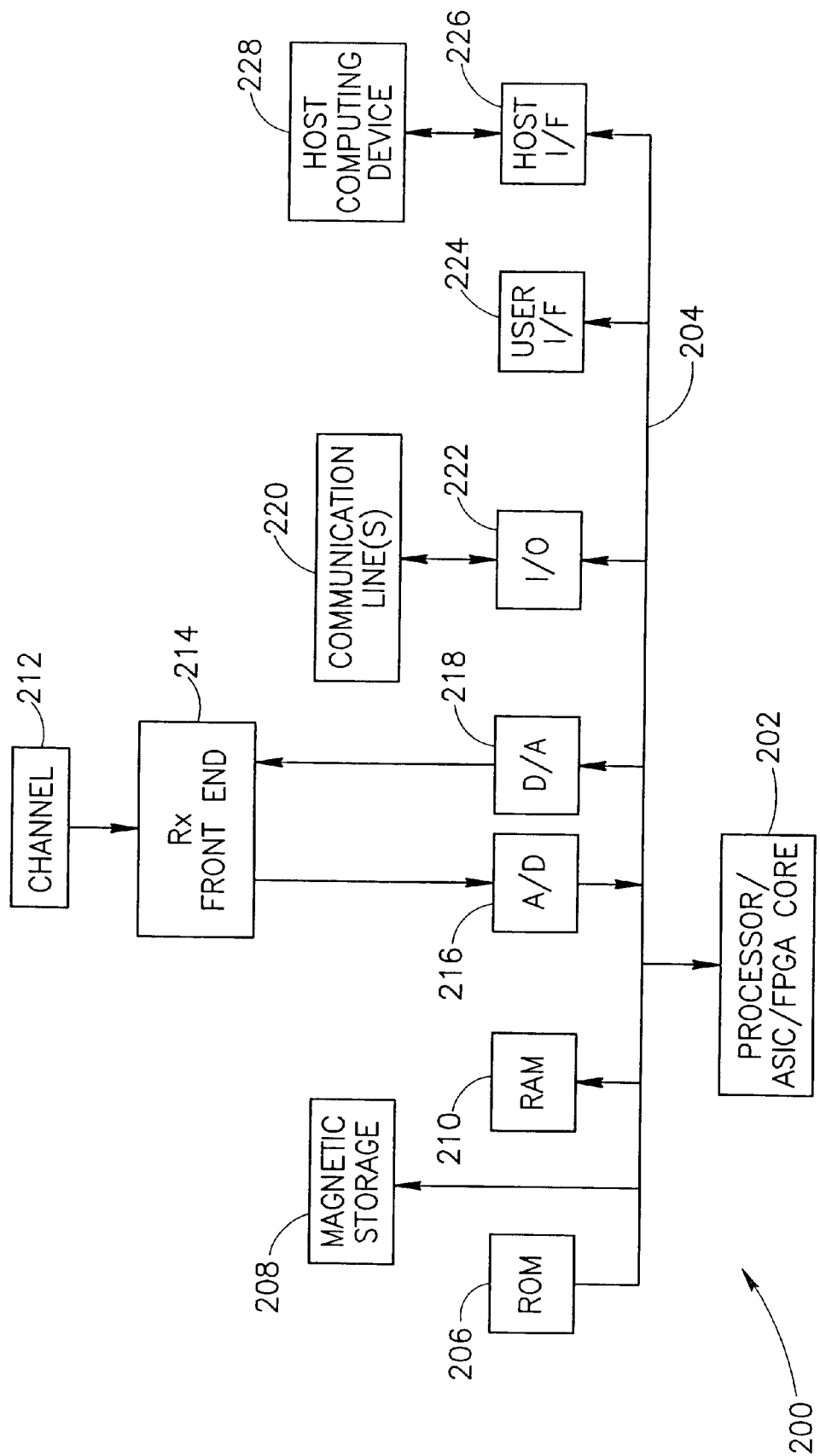
FIG. 10 is a block diagram illustrating an example computer processing system adapted to perform the interference reduction technique of the present invention.

In alternative embodiments, the present invention may be applicable to implementations of the invention in integrated circuits or chip sets, wireless implementations, switching system products and transmission system products. For example, a computer is operative to execute software adapted to perform the interference reduction techniques of the present invention. A block diagram illustrating an example computer processing system adapted to perform the interference reduction technique of the present invention is shown in FIG. 10. The system may be incorporated within a communications device such as a receiver, a portion of which is implemented in software.

The computer system, generally referenced 200, comprises a processor or central processing unit (CPU) 202 such as a digital signal processor (DSP), static read only memory (ROM) 204 and dynamic main memory (RAM) 210 all in communication with the processor which may comprise a microcontroller, microprocessor or microcomputer. The processor is also in communication, via a bus 204, with a number of peripheral devices that are also included in the computer system. In the receive direction, an A/D converter 2168 functions to sample the baseband signal output of the Rx front end circuit 214 coupled to the channel 212. In the transmit direction, data from the bus is converted to analog by D/A converter 218 before being output onto the channel via the Rx front end.

One or more communication lines 220 are connected to the system via I/O interface 222. A user interface 224 responds to user inputs and provides feedback and other status information. A host interface 226 connects a host device 228 to the system. The host is adapted to configure, control and maintain the operation of the system. The system also comprises magnetic storage device 208 for storing application programs and data. The system comprises computer readable storage medium that may include any suitable memory means, including but not limited to, magnetic storage, optical storage, semiconductor volatile or non-volatile memory such as EEROM, biological memory devices, or any other memory storage device.

The interference reduction software is adapted to reside on a computer readable medium, such as a magnetic disk within a disk drive unit. Alternatively, the computer readable medium may comprise a floppy disk, Flash memory card, EEROM based memory, bubble memory storage, ROM storage, etc. The software adapted to perform the interference reduction method of the present invention may also reside, in whole or in part, in the static or dynamic main memories or in firmware within the processor of the computer system (i.e. within microcontroller, microprocessor or microcomputer internal memory).

In alternative embodiments, the interference reduction method of the present invention may be applicable to implementations of the invention in integrated circuits, field programmable gate arrays (FPGAs), chip sets or application specific integrated circuits (ASICs), wireless implementations and other communication system products.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of reducing interference in a communications receiver coupled to a channel, said method comprising the steps of:

determining a plurality of interference templates, each interference template comprising statistics derived from a different interference signal;

generating statistics of a noise vector derived from a received signal;

selecting an interference template corresponding to a best match between said noise vector statistics and each said interference template;

generating noise whitening coefficients in accordance with said selected interference template; and filtering said received signal utilizing a compensation filter whose filter coefficients are chosen in accordance with said selected interference template.

2. The method according to claim 1, wherein the interference template for an interference signal is determined by inputting said interference signal into a filter and calculating the autocorrelation of the output thereof.

3. The method according to claim 1, wherein the interference template for an interference signal is determined by the following steps:

inputting said interference signal into a filter and calculating the autocorrelation of the output thereof;

calculating a first power spectrum of said interference signal in accordance with said autocorrelation; and constructing a matched filter having a second power spectrum substantially matching said first power spectrum.

4. The method according to claim 1, wherein the interference template for an interference signal is approximated by the following steps:

injecting an information signal into a first channel;

injecting said interference signal into a second channel whose output is subsequently summed with the output of said first channel and then passed through a receive filter;

varying said interference signal and said channel input so as to generate a plurality of sets of receive filter outputs;

calculating an autocorrelation result from each set of filter outputs; and calculating a mean autocorrelation from said autocorrelation results.

5. The method according to claim 1, wherein the interference template for an interference signal is determined by the following steps:

injecting an information signal into a first channel;

injecting said interference signal into a second channel whose output is subsequently summed with the output of said first channel and then passed through a receive filter;

varying said interference signal and said channel input so as to generate a plurality of sets of receive filter outputs;

calculating an autocorrelation result from each set of receive filter outputs;

calculating a mean autocorrelation from said autocorrelation results;

calculating a first power spectrum of said interference signal in accordance with said mean autocorrelation; and constructing a matched filter having a second power spectrum substantially matching said first power spectrum.

6. The method according to claim 1, wherein said noise vector statistics are generated utilizing a channel estimate and a set of training sequence symbols.

7. The method according to claim 1, wherein said step of generating said noise vector statistics comprise the step of generating the autocorrelation coefficients of the noise vector of said received signal.

8. The method according to claim 1, wherein said step of selecting an interference template comprises generating a sum of the squares of the differences between said noise vector statistic and each said interference template and selecting the interference template yielding a minimum sum.

9. The method according to claim 1, wherein said step of selecting an interference template comprises the steps of:

passing said noise vector through a bank of matched filters, each matched filter adapted to substantially match a different interference template;

measuring the energy generated at the output of each matched filter; and selecting an interference template yielding maximum energy.

10. The method according to claim 1, further comprising the step of generating a reliability metric adapted to indicate the reliability of the selection of said interference template.

11. The method according to claim 10, wherein a low value of reliability metric is generated when said best match is within a predetermined distance from a second best match.

12. The method according to claim 10, wherein an all pass filter is selected in the event said reliability metric is lower than a threshold.

13. The method according to claim 1, wherein said noise whitening coefficients are chosen so as to yield a maximum improvement in the performance of said communications receiver.

14. The method according to claim 1, wherein said compensation filter comprises a Finite Impulse Response (FIR) filter whose taps are selected in accordance with said selected interference template.

15. An apparatus for reducing interference in a communications receiver coupled to a channel, said method comprising the steps of:

template generation means for determining a plurality of interference templates, each interference template comprising statistics derived from a different interference signal;

a noise vector determination mechanism operative to generate statistics of a noise vector derived from a received signal;

an interference detector operative to select an interference template corresponding to a best match between said noise vector statistics and each said interference template;

means for generating noise whitening coefficients in accordance with said selected interference template; and a compensation filter adapted to filter said received signal, said compensation filter comprising filter coefficients choosen in accordance with said selected interference template.

16. The apparatus according to claim 15, wherein said template generation means is adapted to generate an interference template by inputting an interference signal into a filter and calculating the autocorrelation of the output thereof.

17. The apparatus according to claim 15, wherein said template generation means comprises means adapted to:

input said interference signal into a filter and calculate the autocorrelation of the output thereof;

calculate a first power spectrum of said interference signal in accordance with said autocorrelation; and construct a matched filter having a second power spectrum substantially matching said first power spectrum.

18. The apparatus according to claim 15, wherein said template generation means is adapted to generate an interference template for an interference signal by:

injecting said interference signal into a channel whose output is subsequently filtered;

varying said interference signal and said channel input so as to generate a plurality of sets of filter outputs;

calculating an autocorrelation result from each set of filter outputs; and calculating a mean autocorrelation from said autocorrelation results.

19. The apparatus according to claim 15, wherein said template generation means is adapted to generate an interference template for an interference signal by:

injecting an information signal into a first channel;

injecting said interference signal into a second channel whose output is subsequently summed with the output of said first channel and then passed through a receive filter;

varying said interference signal and said channel input so as to generate a plurality of sets of filter outputs;

calculating an autocorrelation result from each set of filter outputs;

calculating a mean autocorrelation from said autocorrelation results;

calculating a first power spectrum of said interference signal in accordance with said mean autocorrelation; and constructing a matched filter having a second power spectrum substantially matching said first power spectrum.

20. The apparatus according to claim 15, wherein said noise vector determination mechanism comprises means for generating said noise vector statistic utilizing a channel estimate and a set of training sequence symbols.

21. The apparatus according to claim 15, wherein said noise vector determination mechanism comprises means for generating the autocorrelation coefficients of the noise vector of said received signal.

22. The apparatus according to claim 15, wherein said interference detector comprises:

means for passing said noise vector through a bank of matched filters, each matched filter adapted to substantially match a different interference template;

means for measuring the energy generated at the output of each matched filter; and means for selecting an interference template yielding maximum energy.

23. The apparatus according to claim 15, further comprising means for generating a reliability metric adapted to indicate the reliability of the selection of said interference template.

24. The apparatus according to claim 23, wherein said means for generating a reliability metric is adapted to generate a low value of reliability metric when said best match is within a predetermined distance from a second best match.

25. The apparatus according to claim 23, wherein said means for generating noise whitening coefficients is adapted to generate noise whitening coefficients constituting an all pass filter in the event said reliability metric is lower than a threshold.

26. The apparatus according to claim 15, wherein said means for generating noise whitening coefficients is adapted to generate noise whitening coefficients so as to yield a maximum improvement in the performance of said communications receiver.

27. The apparatus according to claim 15, wherein said compensation filter comprises a Finite Impulse Response (FIR) filter whose taps are choosen in accordance with said selected interference template.

28. A method of reducing interference in a communications receiver coupled to a channel, said method comprising the steps of:

determining a plurality of interference templates, each interference template comprising statistics derived from a different interference signal and being of either a deterministic type or an adaptive type;

generating statistics of a noise vector derived from a received signal;

selecting an interference template corresponding to a best match between said noise vector statistics and each said interference template;

if said selected interference template is of the deterministic type, generating noise whitening coefficients utilizing previously calculated coefficients;

if said selected interference template is of the adaptive type, generating noise whitening coefficients utilizing a moving average model; and equalizing said received signal utilizing equalization coefficients derived from said noise whitening coefficients.

29. The method according to claim 28, wherein the interference template for an interference signal is determined by inputting said interference signal into a filter and calculating the autocorrelation of the output thereof.

30. The method according to claim 28, wherein the interference template for an interference signal is determined by the following steps:

inputting said interference signal into a filter and calculating the autocorrelation of the output thereof;

calculating a first power spectrum of said interference signal in accordance with said autocorrelation; and constructing a matched filter having a second power spectrum substantially matching said first power spectrum.

31. The method according to claim 28, wherein the interference template for an interference signal is approximated by the following steps:

injecting said interference signal into a channel whose output is subsequently filtered;

varying said interference signal and said channel input so as to generate a plurality of sets of filter outputs;

calculating an autocorrelation result from each set of filter outputs; and calculating a mean autocorrelation from said autocorrelation results.

32. The method according to claim 28, wherein the interference template for an interference signal is determined by the following steps:

injecting an information signal into a first channel;

injecting said interference signal into a second channel whose output is subsequently summed with the output of said first channel and then passed through a receive filter;

varying said interference signal and said channel input so as to generate a plurality of sets of filter outputs;

calculating an autocorrelation result from each set of filter outputs;

calculating a mean autocorrelation from said autocorrelation results;

calculating a first power spectrum of said interference signal in accordance with said mean autocorrelation; and constructing a matched filter having a second power spectrum substantially matching said first power spectrum.

33. The method according to claim 28, wherein said noise vector statistics are generated utilizing a channel estimate and a set of training sequence symbols.

34. The method according to claim 28, wherein said step of generating said noise vector statistics comprise the step of generating the autocorrelation coefficients of the noise vector of said received signal.

35. The method according to claim 28, wherein said step of selecting an interference template comprises generating a sum of the squares of the differences between said noise vector statistic and each said interference template and selecting the interference template yielding a minimum sum.

36. The method according to claim 28, wherein said step of selecting an interference template comprises the steps of:

passing said noise vector through a bank of matched filters, each matched filter adapted to substantially match a different interference template;

measuring the energy generated at the output of each matched filter; and selecting an interference template yielding maximum energy.

37. The method according to claim 28, further comprising the step of generating a reliability metric adapted to indicate the reliability of the selection of said interference template.

38. The method according to claim 37, wherein a low value of reliability metric is generated when said best match is within a predetermined distance from a second best match.

39. The method according to claim 37, wherein said noise whitening coefficients selected comprise an all pass filter in the event said reliability metric is lower than a threshold.

40. The method according to claim 28, wherein said noise whitening coefficients are chosen so as to yield a maximum improvement in the performance of said communications receiver.

41. The method according to claim 28, wherein said step of equalization comprises implementing a decision feedback equalizer (DFE) whereby estimated noise values are subtracted from said received signal before input thereto.

42. An apparatus for reducing interference in a communications receiver coupled to a channel, said method comprising the steps of:

template generation means for determining a plurality of interference templates, each interference template comprising statistics derived from a different interference signal and being of either a deterministic type or an adaptive type;

a noise vector determination mechanism operative to generate statistics of a noise vector derived from a received signal;

an interference detector operative to select an interference template corresponding to a best match between said noise vector statistics and each said interference template;

means for generating noise whitening coefficients utilizing previously calculated coefficients if said selected interference template is of the deterministic type or utilizing a moving average model if said selected interference template is of the adaptive type; and an equalizer operative to equalize said received signal utilizing equalization coefficients derived from said noise whitening coefficients.

43. The apparatus according to claim 42, wherein said template generation means is adapted to generate an interference template by inputting an interference signal into a filter and calculating the autocorrelation of the output thereof.

44. The apparatus according to claim 42, wherein said template generation means comprises means adapted to:
input said interference signal into a filter and calculate the autocorrelation of the output thereof;
calculate a first power spectrum of said interference signal in accordance with said autocorrelation; and
construct a matched filter having a second power spectrum substantially matching said first power spectrum.

45. The apparatus according to claim 42, wherein said template generation means is adapted to generate an interference template for an interference signal by:
injecting said interference signal into a channel whose output is subsequently filtered;
varying said interference signal and said channel input so as to generate a plurality of sets of filter outputs;
calculating an autocorrelation result from each set of filter outputs; and
calculating a mean autocorrelation from said autocorrelation results.

46. The apparatus according to claim 42, wherein said template generation means is adapted to generate an interference template for an interference signal by:
injecting an information signal into a first channel;
injecting said interference signal into a second channel whose output is subsequently summed with the output of said first channel and then passed through a receive filter;
varying said interference signal and said channel input so as to generate a plurality of sets of filter outputs;
calculating an autocorrelation result from each set of filter outputs;
calculating a mean autocorrelation from said autocorrelation results;
calculating a first power spectrum of said interference signal in accordance with said mean autocorrelation; and
constructing a matched filter having a second power spectrum substantially matching said first power spectrum.

47. The apparatus according to claim 42, wherein said noise vector determination mechanism comprises means for generating said noise vector statistic utilizing a channel estimate and a set of training sequence symbols.

48. The apparatus according to claim 42, wherein said noise vector determination mechanism comprises means for generating the autocorrelation coefficients of the noise vector of said received signal.

49. The apparatus according to claim 42, wherein said interference detector comprises:
means for passing said noise vector through a bank of matched filters, each matched filter adapted to substantially match a different interference template;
means for measuring the energy generated at the output of each matched filter; and
means for selecting an interference template yielding maximum energy.

50. The apparatus according to claim 42, further comprising means for generating a reliability metric adapted to indicate the reliability of the selection of said interference template.

51. The apparatus according to claim 50, wherein said means for generating a reliability metric is adapted to generate a low value of reliability metric when said best match is within a predetermined distance from a second best match.

52. The apparatus according to claim 50, wherein said means for generating noise whitening coefficients is adapted to generate noise whitening coefficients constituting an all pass filter in the event said reliability metric is lower than a threshold.

53. The apparatus according to claim 42, wherein said means for generating noise whitening coefficients is adapted to generate noise whitening coefficients so as to yield a maximum improvement in the performance of said communications receiver.

54. The apparatus according to claim 42, wherein said equalizer comprises a decision feedback equalizer (DFE) whereby estimated noise values are subtracted from said received signal before input thereto.

55. A method of reducing interference in a communications receiver coupled to a channel, said method comprising the steps of:
determining a plurality of interference templates, each interference template comprising statistics derived from a different interference signal and being of either a deterministic type or an adaptive type;
generating statistics of a noise vector derived from a received signal;
selecting an interference template corresponding to a best match between said noise vector statistics and each said interference template;
generating a first plurality of noise whitening coefficients in accordance with said selected interference template;
if said selected interference template is of the deterministic type, generating a second plurality of noise whitening coefficients utilizing previously calculated coefficients;
if said selected interference template is of the adaptive type, generating said second plurality of noise whitening coefficients utilizing a moving average model;
filtering said received signal utilizing a compensation filter whose filter coefficients are chosen in accordance with said selected interference template; and
equalizing the output of compensation filter utilizing equalization coefficients derived from said first plurality of noise whitening coefficients.

56. An electronic data storage media storing a computer program adapted to program a computer to execute the reduced interference process of claim 55.

57. A communications receiver for receiving and decoding an M-ary transmitted signal, comprising:
a radio frequency (RF) front end circuit for receiving and converting said M-ary transmitted signal to a baseband signal;
a demodulator adapted to receive said baseband signal and to generate a received signal therefrom in accordance with the M-ary modulation scheme used to generate said transmitted signal;
an interference reduction mechanism operative to:
determine a plurality of interference templates, each interference template comprising statistics derived from a different interference signal and being of either a deterministic type or an adaptive type;

generate statistics of a noise vector derived from a received signal;

select an interference template corresponding to a best match between said noise vector statistics and each said interference template;

generate a first plurality of noise whitening coefficients in accordance with said selected interference template;

if said selected interference template is of the deterministic type, generate a second plurality of noise whitening coefficients utilizing previously calculated coefficients;

if said selected interference template is of the adaptive type, generate said second plurality of noise whitening coefficients utilizing a moving average model;

a compensation filter adapted to filter said received signal and whose filter coefficients are chosen in accordance with said selected interference template;

an equalizer adapted to equalize the output of said compensation filter utilizing equalization coefficients derived from said first plurality of noise whitening coefficients so as to generate a sequence of hard symbol decisions therefrom;

a soft output generator adapted to generate soft output decisions from said sequence of hard symbol decisions; and a second decoder adapted to receive said soft output values and to generate binary received data therefrom.

58. The receiver according to claim 57, wherein said communications receiver is adapted to receive and decode a Global System for Mobile Communication (GSM) EDGE signal.

59. The receiver according to claim 57, wherein said communications receiver is adapted to receive and decode a GSM EDGE Radio Access Network (GERAN) system signal.

60. The receiver according to claim 57, wherein said M-ary symbol comprises an 8-PSK symbol.

61. The receiver according to claim 57, wherein said equalizer comprises a Decision Feedback Equalizer (DFE).

62. A computer readable storage medium having a computer program embodied thereon for causing a suitably programmed system to reduce interference noise from within a receive signal by performing the following steps when such program is executed on said system:

determining a plurality of interference templates, each interference template comprising statistics derived from a different interference signal and being of either a deterministic type or an adaptive type;

generating statistics of a noise vector derived from a received signal;

selecting an interference template corresponding to a best match between said noise vector statistics and each said interference template;

generating a first plurality of noise whitening coefficients in accordance with said selected interference template;

if said selected interference template is of the deterministic type, generating a second plurality of noise whitening coefficients utilizing previously calculated coefficients;

if said selected interference template is of the adaptive type, generating said second plurality of noise whitening coefficients utilizing a moving average model;

filtering said received signal utilizing a compensation filter whose filter coefficients are chosen in accordance with said selected interference template; and equalizing the output of compensation filter utilizing equalization coefficients derived from said first plurality of noise whitening coefficients.

\* \* \* \* \*